(12) United States Patent
Nakayama et al.

(10) Patent No.: US 8,034,738 B2
(45) Date of Patent: Oct. 11, 2011

(54) PROCESS FOR PRODUCING CATALYST BODY FOR PRODUCTION OF BRUSH-SHAPED CARBON NANOSTRUCTURE

(75) Inventors: Yoshikazu Nakayama, Hirakata (JP); Toru Sakai, Shinagawa-ku (JP); Takeshi Nagasaka, Shinagawa-ku (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 12/450,171

(22) PCT Filed: Mar. 13, 2008

(86) PCT No.: PCT/JP2008/054672
§ 371 (c)(1),
(2), (4) Date: Sep. 11, 2009

(87) PCT Pub. No.: WO2008/111653
PCT Pub. Date: Sep. 18, 2008

(65) Prior Publication Data
US 2010/0074833 A1 Mar. 25, 2010

(30) Foreign Application Priority Data
Mar. 14, 2007 (JP) .................. 2007-064929

(51) Int. Cl.
*B01J 23/70* (2006.01)
(52) U.S. Cl. .................. 502/338; 502/527.13; 502/524; 502/300
(58) Field of Classification Search .................. 502/300, 502/338, 527.13, 524
See application file for complete search history.

(56) References Cited

U.S. PATENT DOCUMENTS
7,389,675 B1 * 6/2008 Hunter et al. ............... 73/31.06
2007/0173404 A1 * 7/2007 Kureti et al. ................. 502/316

FOREIGN PATENT DOCUMENTS
JP 2004-284938 10/2004
(Continued)

OTHER PUBLICATIONS

K. Bartsch et al., "Effects of catalyst pre-treatment on the growth of single-walled carbon ...", Science Direct, Dec. 5, 2006, pp. 543-552, vol. 45, Elscvier Ltd.

(Continued)

*Primary Examiner* — Stuart Hendrickson
*Assistant Examiner* — Richard M Rump
(74) *Attorney, Agent, or Firm* — DLA Piper LLP (US)

(57) ABSTRACT

It is intended to highly efficiently produce a high-density brush-shaped carbon nanostructure useful in the production of CNT assembly, such as rope-shaped CNTs, and provide a catalyst body for production of brush-shaped carbon nanostructure that enables the production. The catalyst body for production of brush-shaped carbon nanostructure is one comprising a substrate (32), an aggregation suppressive layer (34) superimposed on a surface thereof and a catalyst layer superimposed on the aggregation suppressive layer (34). The catalyst layer is a catalyst particle layer (44) consisting of metallic catalyst particles (42) composed mainly of a catalytic metal. The metallic catalyst particles (42) have an average particle diameter, D, satisfying the relationship $0.5\ \text{nm} \leq D \leq 80\ \text{nm}$, and individual particles of the metallic catalyst particles (42) have a diameter, d, falling within the range of the above average particle diameter (D). Further, there are disclosed a process for producing the catalyst body, a brush-shaped carbon nanostructure and a process for producing the same.

1 Claim, 15 Drawing Sheets

FOREIGN PATENT DOCUMENTS

| | | |
|---|---|---|
| JP | 2006-036593 | 2/2006 |
| JP | 2006036593 A * | 2/2006 |
| WO | WO 2004067171 A1 * | 8/2004 |
| WO | WO 2005/102924 | 11/2005 |

OTHER PUBLICATIONS

Baratunde A. Cola et al., "Photoacoustic characterization of carbon nanotube . . . ", The Journal of Applied Physics, Mar. 12, 2007, pp. 054313-1 to 054313-9, vol. 101.

Yiming Li et al., "Growth of single-walled carbon nanotubes . . . ", The J. Phys. Chem., 2001, pp. 11424-11431, vol. 105, American Chemical Society.

Kenji Nishimura et al., "In situ study of iron catalysts for carbon nanotube growth . . . ", The Japanese Journal of Applied Physics, 2004, pp. L471-L474, vol. 43, No. 4A.

* cited by examiner (1A)

(1B)

(1C)

(1D)

(8A)

(8B)

(12A)

(12B)

(12C)

(15A)

(15B)

(16A)

200 nm (16B)

100nm (17A)

(17B)

(17C)

PROCESS FOR PRODUCING CATALYST BODY FOR PRODUCTION OF BRUSH-SHAPED CARBON NANOSTRUCTURE

FIELD OF THE INVENTION

The present invention is related to a catalyst body for production of brush-shaped carbon nanostructure and its production method. Especially, it is related to a catalyst body for production of brush-shaped carbon nanostructure, its production method, the brush-like CNT structure generated by means of said catalyst body, and the production method of said structure by the use of the catalyst body.

BACKGROUND ART

The carbon nanostructure of the present invention is a nanosize material composed of carbon atoms, and for example, carbon nanotube (subsequently referred to as "CNT"), carbon nanocoil (subsequently referred to "CNC") in which a CNT is formed in the shape of a coil, beaded CNT in which beads are formed on a CNT, cup stack type nanotube formed by bottomless cup-like graphenes stacking on one another, and others are known. Furthermore, a carbon nanostructure that is formed by nanosized carbon materials close-packed in shape of a brush, such as brush-like CNTs, in which CNCs or CNTs are packed closely in shape of a brush, or carbon nanohorns, in which a large number of CNTs whose tip is rolled in shape of a horn are close-packed radially, is referred to as a brush-like carbon nanostructure.

CNT is a pipe-like carbon material whose approximate diameter is about 0.5-10 nm, and whose length of about 1 μm. It is a novel carbon material discovered in 1991 by Iijima. Because CNTs have an extremely minute structure, it is difficult to observe or manipulate them by naked eye, and to improve their handling characteristics and processing property, production of CNT aggregates has been attempted. For example, it is possible to produce a CNT aggregate that can be viewed by naked eye, and as described subsequently in detail, there exists a rope-like CNT aggregate produced by using a so-called CNT structure formed in shape of a brush (subsequently referred to as "rope-like CNTs").

FIG. 15 is a schematic figure in which the production method of conventional rope-like CNTs 152 is explained. It is possible to produce rope-like CNTs 152, by forming brush-like CNTs 148, oriented substantially perpendicularly with respect to substrate 132, on the surface of said substrate 132, as shown in (15A), and pulling bundle-like CNT aggregate 150, which are adjacently placed, intertwined multiple CNTs 146, by means of tweezers 160, as shown in (15B). That is to say, the manufacturing process of an aggregate comprising of multiple CNTs 146, or so-called rope-like CNTs 152, consists of: (1) the chemical vapor deposition (CVD) process, in which multiple CNTs 146 that are oriented substantially perpendicularly with respect to substrate 132 are formed on a substrate; (2) the cleavage process, in which substrate 132 is cleaved; and (3) the pulling process, in which rope-like CNTs 152 are formed by pulling multiple CNTs 146 or a bundle-like CNT aggregate 150. In the WO2005/102924A1 pamphlet (patent document 1), production methods of rope-like CNTs, which are a bundle-like aggregate of mutually intertwined multiple CNTs, and of a "CNT sheet", which is a CNT aggregate of these rope-like CNTs (in patent document 1, it is referred to as a "CNT rope") that have been assembled in a plane, are described.

In non-patent document 1, a technical explanation is made concerning the temperature increase process of an iron catalyst, where the iron catalyst under a helium gas atmosphere, during a process where the CNT structure growth temperature (700° C.) is reached from room temperature, undergoes a phase transition from the iron elemental state through the magnetite ($Fe_3O_4$) state, completing at the iron oxide state of hematite ($Fe_2O_3$) at 700° C. (16A) of FIG. 16 is an atomic force microscope (AFM) image of the iron catalyst particle formed by the conventional silicon substrate surface mentioned in non-patent document 1. (16B) is an expansion image of the area (length and width both 500 nm) in (16A) indicated by the dotted line. Enlarged catalyst particles, which are aggregates of iron particles that have grown to the catalyst particle diameter of around 100 nm, are formed, and they exceed the particle diameter suitable for the growth of CNTs. Furthermore, the density of the iron catalyst particles is greatly reduced by the formation of the enlarged catalyst particles.

[patent document 1] PCT Publication WO2005/102924A1
[non-patent document 1] Kenji Nishimura, Nobuharu Okazaki, Lujin Pan, and Yoshikazu Nakayama, Japanese Journal of Applied Physics, Vol. 43, No. 4A, 2004, pp. L471-L474

DISCLOSURE OF THE INVENTION

Problems to be Solved by the Invention

FIG. 17 is a schematic illustration that shows the configuration of conventional catalyst body 101 and brush-like CNTs 148, and their production method. Here, the formation process and others of the enlarged catalyst particles shown in FIG. 15 are explained. As shown in (17A), catalyst layer 140 comprising an iron film is formed on the surface of conventional silicon substrate 132, and as shown in (17B) iron catalyst particles 142 are formed from said catalyst layer 140 by heat treatment under an inert gas atmosphere. However, because conventional silicon substrate 132 has a high affinity with the catalyst metal such as iron, silicidated particles 143, on which iron silicide is formed, grow at the interface with silicon substrate 132, and they become bound to the substrate and take on a hemispheric configuration, and thus a result that CNTs do not grow has been observed. Furthermore, as indicated in FIG. 17, in the temperature increasing process where iron catalyst particles 142 are formed, the iron particles aggregate, and enlarged catalyst particles 142a that have grown to exceed the catalyst particle diameter suitable for the growth of CNT are formed. In particular, the tendency became conspicuous in a rapid temperature increase. As shown in (17C), CNTs 146 do not grow from enlarged catalyst particles 142a having the particle size exceeding the CNT diameter, and it reduced the CNT density of the brush-like CNTs 148.

As described before, rope-like CNTs are described in patent document 1, but the reproducibility is low when continual rope-like CNTs of more than a given length are produced from the conventional brush-like CNTs, and the condition that they can be produced stably and in large quantities had not been elucidated. Furthermore, synthesizing highly dense brush-like CNTs that can produce rope-like CNTs by a rapid synthesis, for example, by a rapid temperature increase of more than 10° C./sec, was difficult by the conventional production method of brush-like CNTs. Therefore, a catalyst body for production of brush-like CNTs that make brush-like CNTs grow from the catalyst layer on a substrate, and stably produce brush-like CNTs in which the density and the height of the CNT were set to be a given value, could not be provided.

To solve the above problem, the present invention has objectives of producing with high efficiency a highly dense brush-like carbon nanostructures, such as brush-like CNTs, which can be used for manufacture of CNT aggregates such as rope-like CNTs; and providing a catalyst body for brush-like carbon nanoscale production that enables their production.

Means to Solve the Problem

The present invention was done to solve the above problem, and the first form of the present invention is a catalyst body for production of brush-shaped carbon nanostructure, comprising a substrate, a reaction preventive layer formed on the surface of said substrate, and a catalyst layer on said reaction preventive layer, wherein said catalyst layer is formed from metallic catalyst particles whose main constituent is a catalyst metal, the mean particle size D of said metallic catalyst particles is in a range of 0.5 nm$\leq$D$\leq$80 nm, and the individual particle size d of said metallic catalyst particle is within the range of said mean particle size D.

The second form of the present invention is the catalyst body for production of brush-shaped carbon nanostructure of the first form, wherein when the half width of the particle size distribution of said metallic catalyst particles is defined as $\Delta$D, the ratio $\Delta$D/D of said half width $\Delta$D corresponding to said mean particle size D is within a range of 0$\leq\Delta$D/D$\leq$0.7, and the number per unit area of said metallic catalyst particles forming said catalyst layer is equal to or greater than $1\times10^8$/cm$^2$.

The third form of the present invention is a catalyst body for production of brush-shaped carbon nanostructure, comprising a substrate, a reaction preventive layer formed on the surface of said substrate, and a catalyst layer on said reaction preventive layer, wherein said catalyst layer comprises a catalyst layer on said reaction preventive layer and an aggregation suppressive layer formed on the surface of said catalyst metal layer.

The fourth form of the present invention is the catalyst body for production of brush-shaped carbon nanostructure of the third form, wherein said aggregation suppressive layer is formed from a metal oxide of a metallic element that constitutes said catalyst metal layer.

The fifth form of the present invention is the catalyst body for production of brush-shaped carbon nanostructure of the first, second, third, or fourth form, wherein the thickness of said reaction preventive layer is equal to or greater than 10 nm.

The sixth form of the present invention is a process for producing catalyst body for production of brush-shaped carbon nanostructure, comprising the steps of forming a reaction preventive layer consisting of oxides on the surface of a substrate by heating-treating said substrate, forming a catalyst metal layer on the surface of said reaction preventive layer, forming an aggregation suppressive layer consisting of metal oxide on the surface of said catalyst metal layer by heat-treating in a temperature range of 80-800° C., granulating uniformly a catalyst layer consisting of said catalyst metal layer and said aggregation suppressive layer by heating at a temperature increase rate equal to or of more than 10° C./sec; and forming a catalyst particle layer consisting of metallic catalyst particles whose main constituent is a catalyst metal on the surface of said reaction preventive layer.

The seventh form of the present invention is a process for producing brush-shaped carbon nanostructure comprising the steps of arranging the catalyst body for production of brush-shaped carbon nanostructure of the first or second form in a reaction chamber, heating said reaction chamber, delivering at least a raw material gas to said heated reaction chamber, and growing a large number of carbon nanostructures in a brush-like form on the surface of said catalyst particle layer of said catalyst body for production of brush-shaped carbon nanostructure.

The eighth form of the present invention is a brush-like carbon nanostructure comprising a structure of carbon nanotubes produced by the process for production of brush-shaped carbon nanostructure of the seventh form, a bulk density of said structure equal to or greater than 20 mg/cm$^3$, and an average height of said carbon nanotubes equal to or higher than 1 μm.

Effects of the Invention

According to the first form of the present invention, because average particle diameter D of said metallic catalyst particles is within a range of 0.5 nm$\leq$D$\leq$80 nm, and individual particle size d of said metallic catalyst particles is within the range of said average particle diameter D, it can effect a highly efficient growth of a brush-like carbon nanostructure comprising brush-like CNTs by said metallic catalyst particles. Here, said average particle diameter D is the arithmetic mean of all the particles that are observed in a selected square division of 100 nm-10 μm side length. When the number of all said particles is taken as n, and the diameter of an individual particle is taken as $d_i$ (i=1, 2, . . . , n), then average particle diameter D is expressed as D=$(d_1+d_2+ \ldots +d_n)$/n. Said metallic catalyst particles contain a metallic element that acts as a catalyst, that is to say, a catalyst metal as the main component; it is preferable to contain an oxide of the catalyst metal, and a suitable catalyst performance is imparted. When said average particle diameter D is less than 0.5 nm, most of said metallic catalyst particles will have the diameter equal to or less than that of a CNT, and the capability as a catalyst for growing CNTs is lost. In addition, when said average particle diameter D exceeds 80 nm, most of said metallic catalyst particles become larger than the diameter of a CNT, and the number of the metallic catalyst particles for growing CNTs is reduced considerably. Therefore, by said average particle diameter D and said individual particle size d being in said range, brush-like CNTs with uniform CNT diameters can be produced with high efficiency. In addition, the catalyst body concerning the present invention is constituted from the part that is composed of a catalyst material, and from other members (substrate, reaction preventive layer). As for the configuration of the substrate, there are various forms, such as a substrate, a multilayer substrate, a pipe body, a polyhedron, a pellet, and a powder. According to the catalyst body for production of brush-shaped carbon nanostructure concerning the present invention, brush-like CNTs from which rope-like CNTs can be produced, whose CNTs are oriented in high density, can be produced in a large quantity, cheaply, and stably.

In addition, because the catalyst body for production of brush-shaped carbon nanostructure comprises the substrate, the reaction preventive layer that has been formed on said substrate surface, and the catalyst layer on said reaction preventive layer, said reaction preventive layer has an extremely low affinity with said catalyst metal, and therefore during the temperature increasing process at the time of said CNT synthesis, the substrate and the metallic catalyst particles can be prevented from reacting, and the catalyst function of said metallic catalyst particles can be maintained. Said reaction preventive layer is formed from an oxide or a heat resistant resin whose reactivity with the catalyst metal is extremely low, and even if the catalyst body for production of brush-shaped carbon nanostructure concerning the present invention is heat treated with a high temperature, said catalyst metal can prevent a bonding with the substrate materials. More specifically, a reaction preventive layer such as silicon carbide, silicon oxide, aluminum oxide, magnesium oxide, titanium oxide, and zirconium oxide is formed. As for said catalyst metal, it can be chosen appropriately from iron, tin, indium, cobalt, nickel, their alloys, or their oxides, and when metallic catalyst particles in which any of the above catalyst metals is contained as the main component are formed, the reaction of the metallic catalyst particles with the substrate by the heat treatment can be prevented by the reaction preventive layer. For example, in the case in which said metallic catalyst particle comprises one or more types of iron oxide, brush-like CNTs in which the CNTs are densely packed are formed, and in the case in which they include, aside from iron oxide, one or more types of oxide of a selection from tin, indium, cobalt, nickel, and their alloys, it is possible to grow coil-like CNTs, or in other words, carbon nanocoils. Therefore, by choosing accordingly the constituent element and the composition of the metallic catalyst particle, along with the manufacture condition, various kinds of brush-like carbon nanostructures can be produced.

According to the second form of the present invention, because ratio $\Delta D/D$ of said half band width $\Delta D$ with respect to said average particle diameter D is within a range of $0 \leq \Delta D/D \leq 0.7$, by said average particle diameter D being set within a range of 0.5 nm$\leq D \leq$80 nm, individual particle size d of said metallic catalyst particle is set to a suitable size for the growth of CNTs, and uniformized at the same time, and therefore uniform brush-like CNTs can be grown with high efficiency. In said particle size distribution, said half band width $\Delta D$ is within a range of $0 \leq \Delta D/D \leq 0.7$ with respect to average particle diameter D, said particle size d is clustered at the vicinity of said average particle diameter D, the uniformity of said metallic catalyst particles is maintained, and therefore brush-like carbon nanostructures of, among others, brush-like CNTs can be grown with high efficiency, and a high uniformity is realized particularly with brush-like CNTs. When said ratio $\Delta D/D$ exceeds 0.7, because the particle size distribution widens, the diameters of the growing brush-like CNTs become uneven, and it becomes difficult to make rope-like CNTs, and furthermore, it becomes impossible to produce rope-like CNTs whose predetermined diameter is maintained throughout the full length. Furthermore, the number per unit area of said metallic catalyst particles forming said catalyst layer is equal to or more than $1 \times 10^8/cm^2$, and because metallic catalyst particles of the particle size which allows the growth of CNTs are formed uniformly as described above, uniform brush-like CNTs of high density can be produced with high efficiency. It has been confirmed that the production of rope-like CNTs is virtually impossible for the case in which the CNT density of the brush-like CNTs is less than $1 \times 10^8/cm^2$, and as described above, it is required that the density of said metallic catalyst particle is equal to or more than $1 \times 10^8/cm^2$, at least. Considering that it is difficult to make CNTs grow from all metallic catalyst particles, it is more preferable that the number per unit area of said metallic catalyst particle is equal to or more than $1 \times 10^9/cm^2$.

According to the third form of the present invention, because said catalyst layer comprises the catalyst metal layer on said reaction preventive layer and the aggregation suppressive layer which has been formed on the surface of said catalyst metal layer, when brush-like CNTs are grown by heat treatment, it can suppress the aggregation of the metallic catalyst particles which were formed by granulation of the catalyst metal layer, and the enlargement greater than the given particle size suitable for the growth of CNTs. Said catalyst layer of the third form is a precursor to the catalyst particle layer, and by the heat treatment for synthesizing CNTs, the catalyst particle layer is formed from said catalyst layer. Said aggregation suppressive layer is formed by oxides of said catalyst metal layer, and it is preferable for it to have a melting point higher than that of said catalyst metal layer. As an aside, because the fluidity starting temperature of the metal lowers from that of the bulk metal when the thickness of said catalyst metal layer is equal to or less than a few to a few tens of nm, it is sufficient that the fluidity starting temperature of said aggregation suppressive layer is set higher than the lowered fluidity starting temperature of the catalyst metal layer. In addition, in said aggregation suppressive layer, said catalyst metal layer can suppress the oxidation during the granulation process, and the oxidized metal composition within said metallic catalyst particles can be set to a suitable quantity. For example, when said substrate is a silicon substrate, an oxidized silicon layer can be formed as said reaction preventive layer by heating the substrate surface, and said reaction preventive layer can be formed comparatively easily. In this case, the reaction of said catalyst metal with the substrate and the subsequent formation of metal silicide are prevented. As an aside, said silicon substrate allows for the formation of a flat surface of high precision, and at the same time, can be produced cheaply, and therefore it is a preferable material as the substrate material.

According to the fourth form of the present invention, said aggregation suppressive layer comprises metal oxides of the metallic element composing said catalyst metal layer, and the aggregation suppressive layer can be formed comparatively easily by applying an oxidation treatment on the surface of said catalyst metal layer. In addition, when said aggregation suppressive layer is formed by the physical vapor deposition method or the chemical vapor deposition method, the affinity with the catalyst metal layer is good, and said aggregation suppressive layer can formed with higher efficiency. The metal oxide forming the aggregation suppressive layer concerning the present invention has a high melting point than that of the catalyst metal layer. Therefore, as described above, in the growth process of the brush-like CNTs in which heat treatment is applied, it can suppress the aggregation of said granulated catalyst metal layer by surface fusion and the enlargement greater than the given particle size suitable for the growth of CNTs. In addition, said aggregation suppressive layer, in said heat treatment process and at the time of the formation of said catalyst particle layer, can prevent an excessive oxidation of said catalyst metal. More specifically, when said catalyst metal layer is formed from iron, tin, indium, cobalt, or nickel, said aggregation suppressive layer is formed, respectively, by $FeO$, $Fe_2O_3$, $Fe_3O_4$, $SnO_2$, $CoO$, or $NiO$.

According to the fifth form of the present invention, because the thickness of said reaction preventive layer is equal to or greater than 10 nm, the reaction between said catalyst layer and said substrate can be prevented more securely. When the thickness of said reaction preventive layer is less than 10 nm, there is a possibility that the substrate materials diffuse to said reaction preventive layer by the heat treatment, causing a reaction with said catalyst metal. The present inventors have performed an examination on the effect of the reaction preventive layer at the growth temperature of CNTs, and confirmed that when the thickness of said reaction preventive layer is equal to or greater than 10 nm, the reaction between said catalyst layer and said substrate is definitely prevented. Thickness of said reaction preventive layer can be set appropriately according to the purpose of the brush-like CNTs, the substrate structure, and others, as long as said thickness is equal to or more than 10 nm.

According to the sixth form of the present invention, the catalyst layer comprising said catalyst metal layer and said aggregation suppressive layer is comparatively uniformly granulated by the rapid temperature increase equal to or greater than 10° C./sec, and the catalyst body for production of brush-shaped carbon nanostructure in which the metallic catalyst particles are distributed uniformly and in high density can be produced with high efficiency. In addition, because substrate is heat treated, and reaction preventive layer comprising the oxides is formed on the substrate surface, said catalyst metal can be prevented from reacting with the substrate during the granulation of said catalyst layer by the heat treatment. Furthermore, because the aggregation suppressive layer comprising of metal oxides is formed on the surface of said catalyst metal layer by heat treating said catalyst layer at a temperature range of 80-800° C. as the preprocessing for the brush-like CNT production, the enlargement greater than the given particle size suitable for the growth of CNTs through aggregation of the metallic catalyst particles can be suppressed. In addition, said aggregation suppressive layer can prevent an excessive oxidation of said catalyst metal at the time of the formation of said catalyst particle layer, and the subsequent reduction of the function as a catalyst for CNT production. Therefore, according to the production method concerning the present invention, the catalyst body that can produce highly dense and uniform brush-like CNTs with high efficiency can be provided.

According to the seventh form of the present invention, because the catalyst body of the first or the second form is arranged in the reaction chamber, and carbon nanostructures of a large number of CNTs are grown on the surface of said catalyst particle layer in shape of a brush, brush-like carbon nanostructures whose configurations, such as the diameters of the CNTs, are more uniform can be produced in high density. As described above, in the catalyst body for production of brush-shaped carbon nanostructure such as the catalyst body for production of brush-like CNTs, the metallic catalyst particles having suitable particle size and catalytic activity are formed uniformly, and they can offer brush-like CNTs of high density. From these brush-like CNTs, rope-like CNTs or a large quantity of CNTs with uniform diameters can be obtained. For said raw material gas, organic gases such as hydrocarbon gas, sulfur-containing organic gas, and phosphorus-containing organic gas can be used. For hydrocarbon, alkane compounds such as methane and ethane, alkene compounds such as ethylene and butadiene, alkyne compounds such as acetylene, aryl hydrocarbon compounds such as benzene, toluene, and styrene, aromatic hydrocarbons with condensed rings such as indene, naphthalene, and phenanthrene, cycloparaffin compounds such as cyclopropane and cyclohexane, cycloolefin compound such as cyclopentene, and alicyclic hydrocarbon compounds with condensed rings such as steroid can be used. In addition, the mixed hydrocarbon gas in which two or more kinds of hydrocarbon compounds have been mixed can be employed. Among the hydrocarbons, ones with low molecular weight, for example acetylene, allylene, ethylene, benzene, and toluene, are preferable. Because acetylene gas $C_2H_2$ is cheap and available easily, it contains a triple bond, and the reactivity with catalyst particles are high, it can be used as the raw material gas that can generate carbon nanostructures of CNTs at the lowest temperature range.

According to the eighth form of the present invention, because brush-like CNTs are produced by the process for producing brush-shaped carbon nanostructure of the sixth form, brush-like CNTs whose average height of said CNTs is equal to or greater than 1 μm, and the bulk density of said structure is equal to or greater than 20 mg/cm$^3$, can be produced easily. The present inventors clarified experimentally that said rope-like CNTs are formed in the case where the average height of the CNTs composing brush-like CNTs is equal to or more than about 1 μm, and the CNTs have the density greater than or equal to the given density, and thus arrived at the completion of the present invention. When the average height of said brush-like CNTs is at the level of 1 μm, said given density is reached when said bulk density is equal to or greater than 20 mg/cm$^3$, and rope-like CNTs can be produced from these brush-like CNTs. The higher said average height, and the denser said bulk density of the brush-like CNTs, the more suitable rope-like CNTs can be produced with the higher efficiency.

DENOTATION OF REFERENCE NUMERALS

Figure 1:
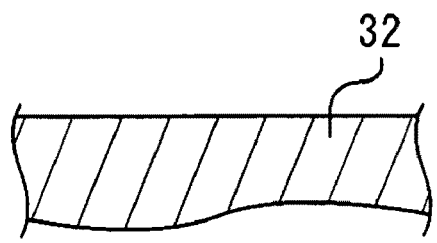
FIG. 1 is a schematic illustration which shows the manufacturing process of the catalyst body for production of brush-shaped carbon nanostructure concerning the present invention.
Figure 1:
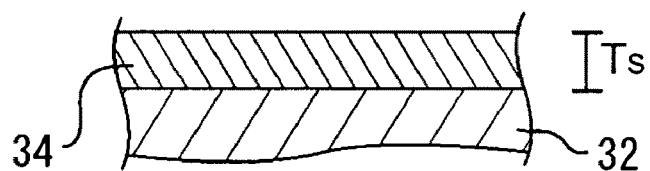
Figure 1:
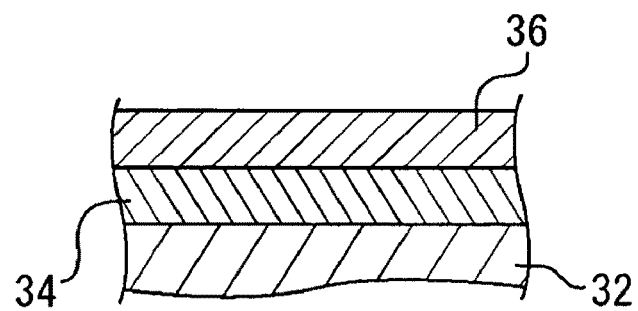
Figure 1:
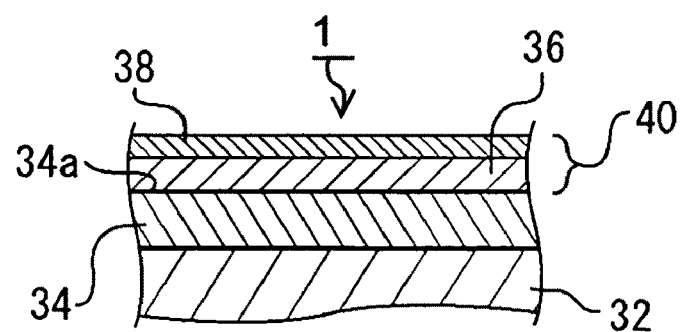

1 Catalyst body
2 Reaction heater
3 Gas exhaust pipeline
4 Reaction chamber
5 Opening and closing valve
7 Opening and closing valve
8 Raw material gas flow controller,
9 Raw material gas inflow line
10 Electromagnetic three-way valve
11 Opening and closing valve
12 Electromagnetic three-way valve
13 Oxygen flow controller
14 Electromagnetic three-way valve
15 Water addition apparatus
16 Gas flow controller
17 Water analyzer
18 Electromagnetic three-way valve
19 Monitoring bypass line
20 Gas flow controller
21 Oxygen analyzer
22 Oxygen flow controller
23 Oxygen flow controller
32 Substrate
34 Reaction preventive layer
36 Catalyst metal layer
38 Aggregation suppressive layer
40 Catalyst layer
42 Metallic catalyst particle
44 Catalyst particle layer
46 CNT
46a Multilayered layer
46b Contact part
48 Brush-like CNTs
101 Catalyst body
132 Substrate or silicon substrate
142 Iron catalyst particle
142a Enlarged catalyst particle
143 Silicidated particle
146 CNT
148 Brush-like CNTs
150 Bundle-like CNT aggregate
152 Rope-like CNTs
160 Tweezers

BEST MODE FOR CARRYING OUT THE INVENTION

FIG. 1 is a schematic illustration which shows the manufacturing process of catalyst body 1 for production of brush-shaped carbon nanostructure concerning the present invention. As shown in (1A), at first, substrate 32 is arranged in a treatment chamber (not shown), oxidative gas is supplied to the surface of this substrate 32, and heat-treatment is performed. As said substrate 32, various kinds of materials having a smooth surface can be used, but a silicon substrate is suitable, since it can be manufactured easily and cheaply using conventional processing techniques. As shown in (1B), on the surface of substrate 32 that has been heat-treated under an oxidative gas atmosphere, reaction preventive layer 34 comprising oxides is formed.

Reaction preventive layer 34, by having thickness $T_S$ of equal to or more than 10 nm, is prevented from having its later-formed catalyst metal layer 36 and its substrate 32 reacting at the time of heating. In addition, for cases in which reaction preventive layer 34 is an oxide, the reaction preventive layer of catalyst metal layer 36 is reduced by the catalyst metal, during the preliminary oxidation process or the rapid temperature increase (80° C./sec) in a CVD process, and the oxygen of reaction preventive layer 34 migrates to catalyst metal layer 36. Therefore, a strong affinity occurs between the substrate and the catalyst metal layer, catalyst particles are not formed in the granulation process described later, and as a result, it is observed that the growth probability of CNT falls. By forming reaction preventive layer 34 which is not reduced by catalyst metal layer 36, or in other words, by using reaction preventive layer 34 that is stable against various conditions such as temperature and pressure, and is completely unreactive toward catalyst metal layer 36, a CNT growth of higher density and probability can be realized. However, because of the problem of production cost, reaction preventive layer 34 is chosen appropriately.

In (1C), on the surface of said reaction preventive layer 34, catalyst metal layer 36 comprising catalyst metal elements suited for the growth of CNTs is formed. For the formation of catalyst metal layer 36, various film formation methods for forming metal membranes and metal powder layers, as well as application methods of complexes in which a metal atom is surrounded by atomic groups referred to as ligands, or so-called coordination compounds, catalyst metal salt solutions containing metal ion, or solid-like organometallic compounds that are solid, liquid, or gas at ordinary temperature and pressure can be used; and the Ar sputtering, the electron beam evaporation method, the dip coating method, the spin coat method, and others can be used, but, it is important that catalyst metal layer 36 of thickness of nanometer order is formed uniformly.

Concerning the catalyst forming a metal membrane or a metal powder layer, as shown in FIG. 1 (1D), the oxidation treatment is performed by heating the surface of said catalyst metal layer under an oxidative gas atmosphere, in a temperature range of 80-800° C., preferably 80-300° C.; aggregation suppressive layer 38 comprising metal oxides is formed on the surface of said catalyst metal layer 36; and catalyst body 1 for brush-like CNT production (henceforth referred as "catalyst body 1") is completed as a catalyst body for production of brush-shaped carbon nanostructure. It is more preferable for the heating temperature in the oxidation treatment to be around 150° C., and aggregation suppressive layer 38 of suitable thickness is formed by application of heat for around 10 minutes. Catalyst layer 40 of said catalyst body 1 is a precursor of the catalyst particle layer described later, comprising said catalyst metal layer 36 and said aggregation suppressive layer 38, and it is granulated by heat treatment at the time of synthesis of CNTs.

In addition, in cases in which a wet process in which complexes in which a metal atom is surrounded by atom groups referred to as ligands, or so-called coordination compounds, or a catalyst metal salt solution containing metal ion is made into a catalyst layer, it is necessary, as shown in FIG.

4, to perform a coating heat treatment in which the solvent of the solution is evaporated (a coating drying process) at a temperature span of 50-300° C. in an inert gas atmosphere or under a vacuum state, as it is described below. Furthermore, in the preliminary oxidation treatment for the metal component after the organic or hydrophilic solvent is completely volatilized, to obtain aggregation suppressive layer 38 that is resistant to a rapid temperature increase (80° C./sec), it is necessary that the oxidation treatment is performed by heating at a temperature range of 80-800° C. For a catalyst layer obtained by the wet process, it is more preferable that the oxidation treatment be performed at a temperature range of 600-700° C.

In the present specification, as shown in (1D) in FIG. 1, catalyst layer 40 comprising said precursor is also defined as a catalyst body 1 for brush-like CNT production according to present invention. As an aside, as said oxidative gas, water, oxygen, acetone, alcohol, DMF (dimethyl formamide), $CO_2$, $CO$, $O_3$, $H_2O_2$, or others is used.

Figure 2:
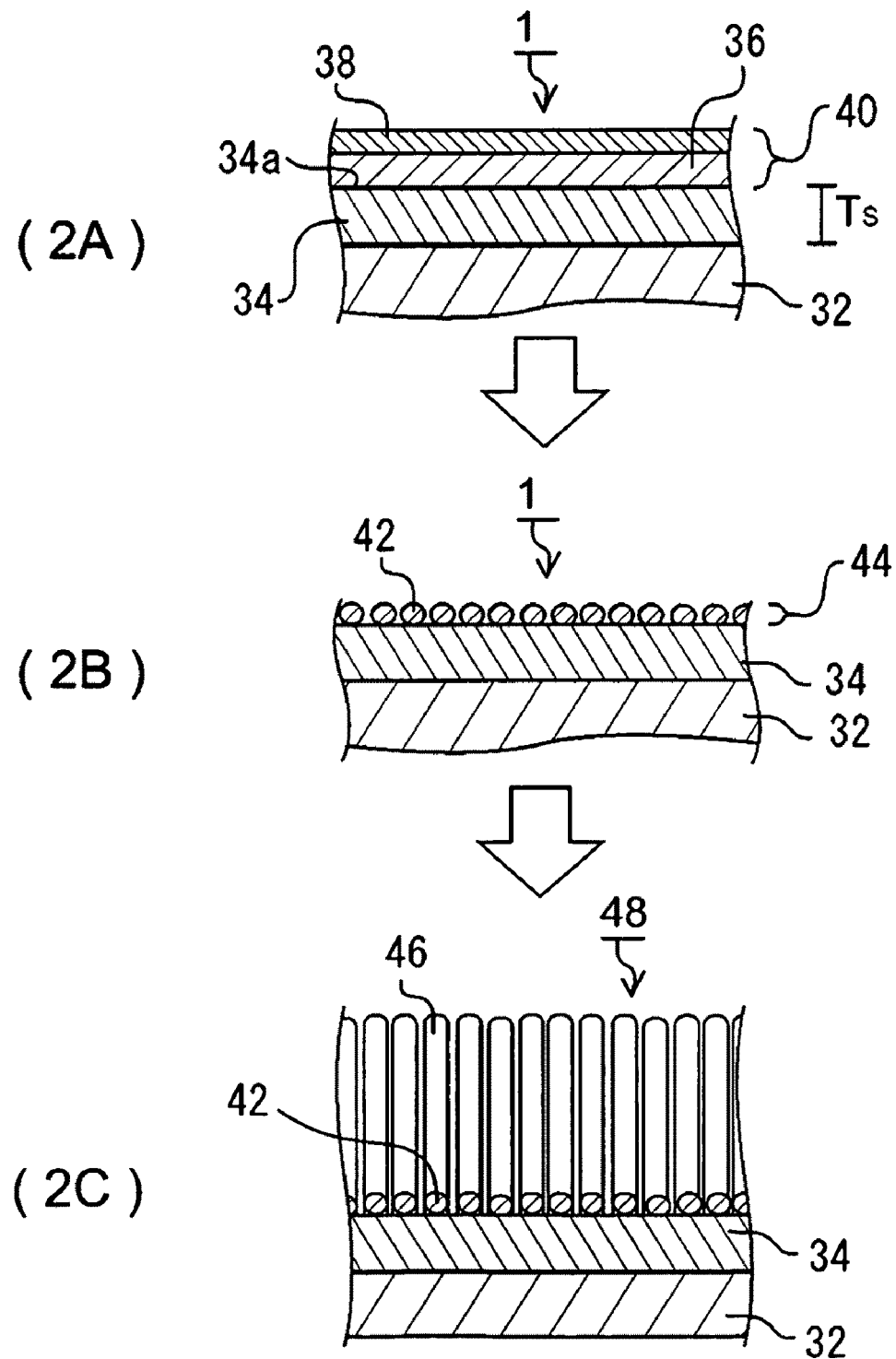
FIG. 2 is a schematic illustration which shows the process in which brush-like CNTs are produced from the catalyst body concerning the present invention.

FIG. 2 is a schematic illustration which shows the process in which brush-like CNTs 48 are produced from catalyst body 1 concerning the present invention. By heat treating said catalyst body 1 shown in (2A), said catalyst layer 40 is granulated, and as shown in (2B), catalyst particles 42 comprising said catalyst metal and its oxides are formed, composing catalyst particle layer 44. Here, if the granulation temperature is around 800° C., a uniform granulation is achieved in said catalyst layer, and a suitable particle size for the growth of CNTs is attained. This is thought be due to the inhibition of fluidization of said catalyst metal layer 36 and of aggregation of the metal particles during the heat treatment, and the suppression of enlargement of said metallic catalyst particle 42 by means of said aggregation suppressive layer. In addition, even when the heat-treatment is performed with a rapid temperature increase of more than 10° C./sec, the enlargement of said metallic catalyst particle 42 is suppressed, a uniform catalyst particle layer 44 suitable for the growth of CNTs is formed, and a suitable catalyst particle layer 44 can be formed even with a rapid temperature increase of about 80° C./sec. Furthermore, as shown in (2C), from said metallic catalyst particle 42, CNTs 46 grow and brush-like CNTs 48 are formed, by supplying the raw material gas and simultaneously heating catalyst body 1.

Figure 3:
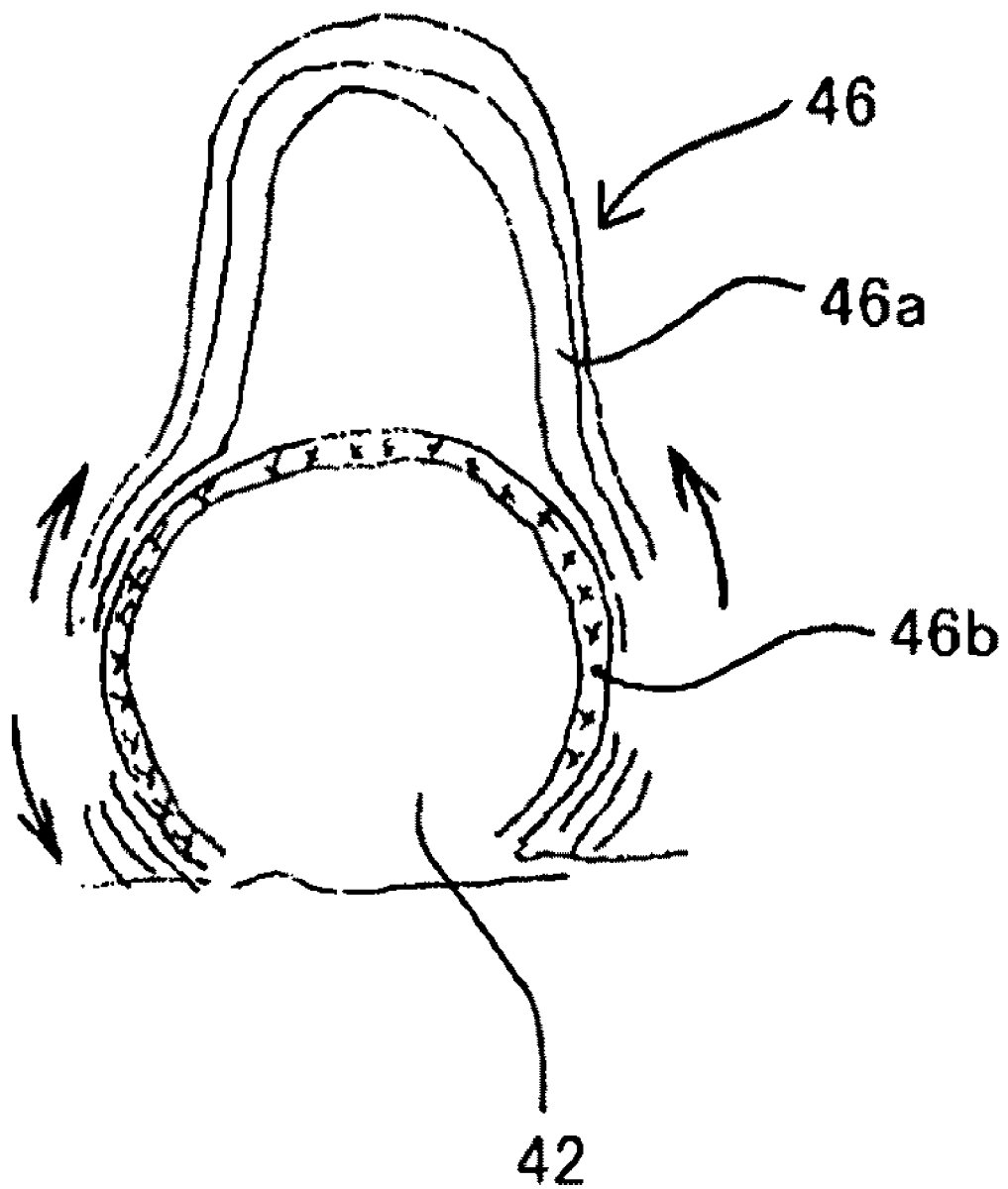
FIG. 3 is a schematic illustration which diagrammatically shows a CNT growing from a metallic catalyst particle concerning the present invention.

FIG. 3 is a schematic illustration which diagrammatically shows CNT 46 growing from metallic catalyst particle 42 concerning the present invention. Said metallic catalyst particle 42 is an iron catalyst particle containing iron as the main component, and it contains an iron oxide component. Metallic catalyst particle 42 which can form CNT 46 may not necessarily be spherical as shown in the figure, and it is suitable if the particle size is 0.5-80 nm. When acetylene gas is supplied as the raw material gas, it is recognized that there is a growth by two reaction phases, namely the early rapid growth, and the slow growth with a simultaneous generation of amorphous carbon, during the synthetic reaction of CNT 46. The explanation here is for the case where the raw material gas is acetylene, but the mechanism is similar for other raw material gases. Particularly, the early rapid reaction is a reaction to rate-limit the reaction consisting mainly of the subsequent formula 1 and 2 at the surface of metallic catalyst particle 42.

$$Fe_2O_3+C_2H_2 \rightarrow 2FeC+H_2O+CO_2 \quad \text{(formula 2)}$$

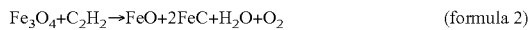

$$Fe_3O_4+C_2H_2 \rightarrow FeO+2FeC+H_2O+O_2 \quad \text{(formula 2)}$$

As for the rapid growth of during the first step, it stops by the consumption of the oxygen quantity retained by the catalyst, and usually the contact between the catalyst and the raw material gas becomes difficult because of the catalyst surface becoming enveloped by the surplus amorphous carbon supplied from the raw material gas, and finally the reaction stops. Because the length of CNT 46 becomes approximately the same when the oxygen retained by said metallic catalyst particle 42 is of similar quantity, it can be understood that there is a reproducibility, and at the same time, that the length of CNT 46 is determined by the quantity of the oxygen retained initially on the catalyst.

Next, the slow growth accompanying the generation of amorphous carbon, which is indispensable for producing CNT with length control, is explained. About the slow growth, it can be understood that it is a reaction where formulae 3 and 4 described below are the predominant reactions, and in which the surface carbon diffusion is rate-limiting.

$$FeO+C_2H_2 \rightarrow FeC+H_2O+C \quad \text{(formula 3)}$$

$$Fe+C_2H_2 \rightarrow FeC+C+H_2 \quad \text{(formula 4)}$$

As shown in FIG. 3, at contact part 46b of metallic catalyst particle 42 coming in contact with acetylene, particle-like carbide bonded with carbon is formed, and multilayered layer 46a constituting the wall of CNT 46 is formed on the surface of this carbide. The amorphous carbon is generated by the reaction of metallic catalyst particle 46 and the raw material gas, and the CNT is formed by the amorphous carbon pushing out multilayered layer 46a. The arrows in the figure show the diffusion directions of carbon. When the affinity between the catalyst metal and the substrate is strong, because metallic catalyst particle 42 does not become spherical, multilayered layers 46a on both sides are not pushed at equal speed, causing the orientation to deviate from verticality; however, in the present invention, said reaction preventive layer is formed, and the affinity is extremely reduced. In addition, in the case where it has moderate affinity, there can also be a situation in which the carbon layer lengthens vertically to some extent, the affinity opposes against the pushing force caused by the diffusion of carbon, and the catalyst rises and places itself in the half-way point of the length direction of CNT 46. As for the metallic catalyst particle, by burning and removing from the catalyst surface the carbon generated through the reactions in formulae 3 and 4 using the oxygen and water contained in the carrier gas and/or the raw material gas, continual generation of CNT 46 becomes possible.

Figure 4:
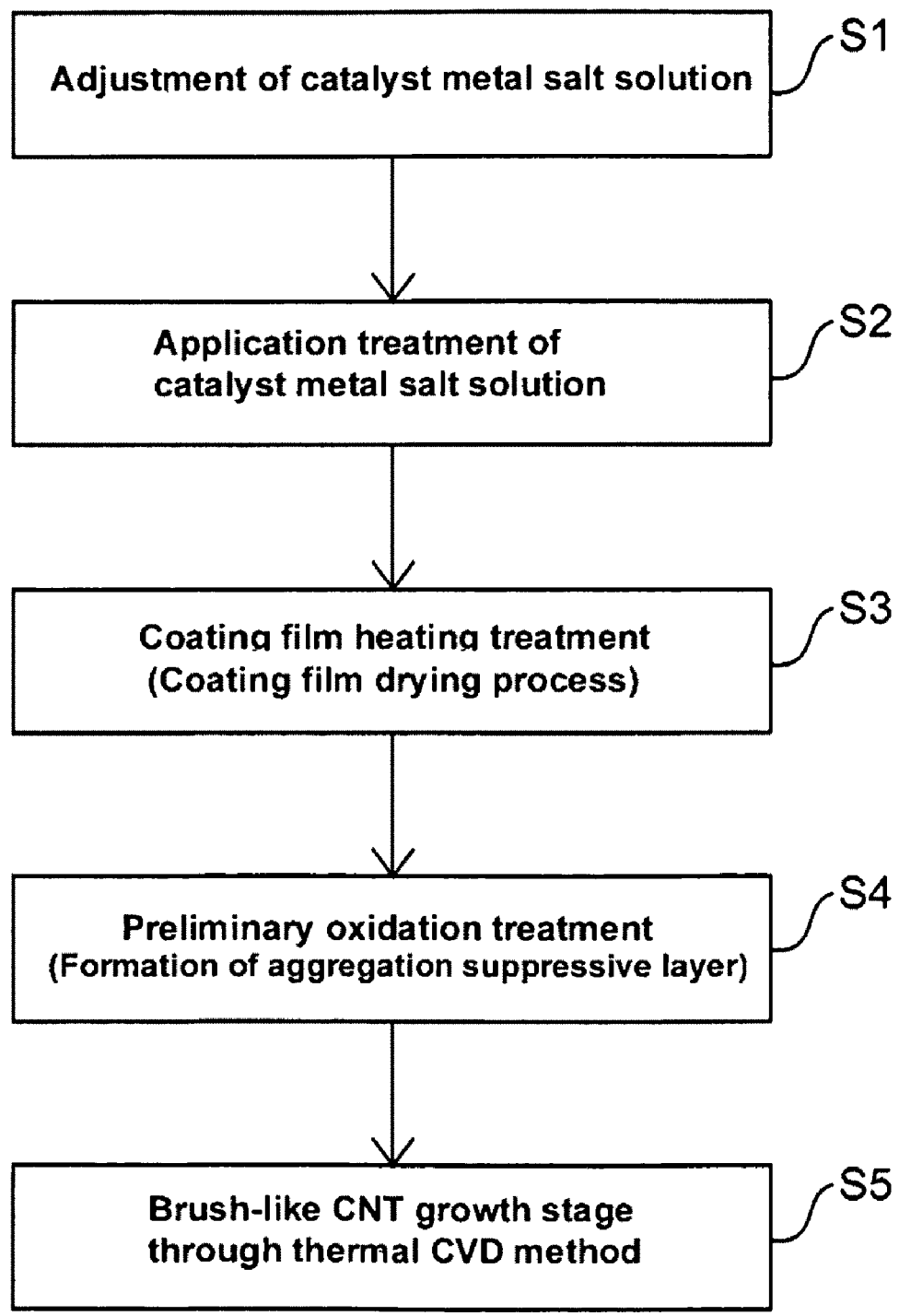
FIG. 4 is a manufacturing process diagram for producing brush-like CNTs by a catalyst body provided by the formation of the catalyst metal layer through the application method of the catalyst metal salt solution concerning the present invention.

In the explanation of FIG. 1, for the formation of catalyst metal layer 36, it was described that aside from the film formation methods such as the physical vapor deposition or the chemical vapor deposition method, a method could be used in which a solution containing the catalyst metal is applied by means of the spin coat method or the dip coat method, whenever complexes in which a metal atom is surrounded by atom groups referred to as ligands, or so-called coordination compounds, or a catalyst metal salt solution containing metal ion is made into the catalyst layer. FIG. 4 is a manufacturing process diagram for producing brush-like CNTs by a catalyst body provided by the formation of the catalyst metal layer through the application method of the catalyst metal salt solution concerning the present invention. In the formation of catalyst metal layer for the use in CNT production, the catalyst metal salt solution is prepared in which a catalyst metal salt is dissolved or dispersed into a solvent whose wettability with said reaction preventive layer is high (catalyst metal salt solution adjustment process S1), and this catalyst metal salt solution is applied onto said reaction preventive layer (application treatment process of catalyst metal salt solution S2).

Next, by heat-treating at a temperature range of 50-300° C. according to the concentration of catalyst metal salt, the heating temperature, and the heating time, the volatilization of the solvent and the isolation of the catalyst metal ion are promoted as indicated in formulae 5 and 6, and the catalyst metal layer is formed on the substrate in the state of metal ion (coating heat-treatment: coating drying process S3).

$$\text{Fe complex} + \text{solvent} \rightarrow \text{Fe ion} + \text{solvent}\uparrow + \text{ligand}\uparrow \quad \text{(formula 5)}$$

$$\text{Fe(NO}_3)_3 + \text{H}_2\text{O(solvent)} \rightarrow \text{Fe}^{2+} + \text{H}_2\text{O}\uparrow + 3\text{NO}\uparrow \quad \text{(formula 6)}$$

After the catalyst layer comprising a catalyst metal layer is formed in the state of metal ion on the substrate, in preliminary oxidation treatment process S4, an oxidation treatment needs to be done on the aggregation suppressive layer resistant to a rapid temperature increase of 80° C./sec, by heating in an atmosphere containing an oxidizing component such as air at a temperature range of 80-800° C. Preliminary oxidation treatment is a process in which metal ion becomes oxidized metal mainly by means of the reactions indicated in formulae 7 and 8.

$$\text{Fe}^{2+} + \tfrac{1}{2}\text{O}_2 \rightarrow \text{FeO} \quad \text{(formula 7)}$$

$$3\text{FeO} + \tfrac{1}{2}\text{O}_2 \rightarrow \text{Fe}_3\text{O}_4 \quad \text{(formula 8)}$$

In the preliminary oxidation treatment, an occurrence of the formation of a metal particle as shown in FIG. 2(2B) is not observed. As shown in FIG. 2 (2A), it can be understood that aggregation prevention layer 38 is formed by a preliminary oxidation treatment on the surface of catalyst metal layer 36. However, whenever complexes in which a metal atom is surrounded by atom groups referred to as ligands, or so-called coordination compounds, or a catalyst metal salt solution containing metal ion is made into catalyst layer 40, in the method where the solution containing the catalyst metal is applied by means of the spin coat method or the dip coat method, because the metal catalyst layer is formed from the metal ion state on the substrate, the formation of a thinner metal catalyst layer (film thickness less than 1 nm) is possible, in comparison with the metal catalyst layer (minimum film thickness 4 nm) which has been formed carefully and industrially, usually through the Ar sputtering method such as physical vapor deposition or chemical vapor deposition method, or the electron beam deposition method. Because the metal catalyst layer is thin, it is recognized that it is necessary in the preliminary oxidation treatment to form aggregation suppressive layer 38 that is resistant to a rapid temperature increase of 80° C./sec, through performing a preliminary oxidation treatment on aggregation suppressive layer 38 by heating in an atmosphere containing oxidative ingredients such as air at a high temperature range of 80-800° C.

After this, as shown in FIGS. 2 and 4, the catalyst body on which catalyst particle layer 44 has been formed is introduced into the brush-like CNT manufacturing apparatus described later, and CNTs are grown by the thermal CVD method (CNT growth treatment process: S5). As an aside, as for the application method for the metal atom in application treatment process of catalyst metal salt solution S2 is surrounded by atom groups referred to as ligands, or so-called coordination compounds, or a catalyst metal salt solution containing metal ion is made into the catalyst layer, the spin coat method or the dip coat method is used.

Figure 5:
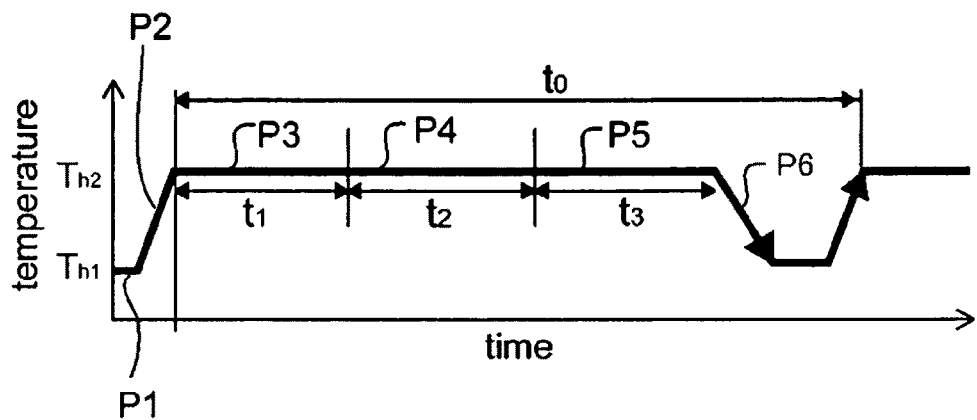
FIG. 5 is a chart that shows the relation between the time course and the temperature variation in the reaction chamber in the manufacturing process of brush-like CNTs concerning the present invention.

FIG. 5 is a chart that shows the relation between the time course and the temperature variation in the reaction chamber in the manufacturing process of brush-like CNTs concerning the present invention. In catalyst body interchange process P1, a catalyst body for brush-like CNT production that has been heated at a heating temperature of 80-300° C., preferably around 150° C., during the preprocessing (preliminary oxidation treatment), and on which said aggregation suppressive layer has been formed, is introduced. Next, in temperature increasing process P2, it is heated from initial temperature $T_{1h}$ to growth temperature $T_{h2}$ of CNT, through a rapid temperature increase of more than 10° C./sec. Growth temperature $T_{h2}$ is around 800° C. In holding process P3, said brush-like CNT catalyst body is held at the reaction temperature for $t_1$ (a few tens of seconds to several minutes), and after a complete thermal equilibrium condition has been reached, the raw material gas is supplied in reaction process P4. Supply time $t_2$ of the raw material gas is a few tens of seconds to several minutes. In purge process P5, the remaining raw material gas is purged by inert gas such as Ar gas; purge time $t_3$ is a few tens of seconds to several minutes. Next, in temperature lowering process P6, the temperature in the reaction chamber is lowered, and the substrate on which brush-like CNTs have been synthesized is taken out. Through a rapid temperature increase, time $t_0$ to the next term can be shortened.

Figure 6:
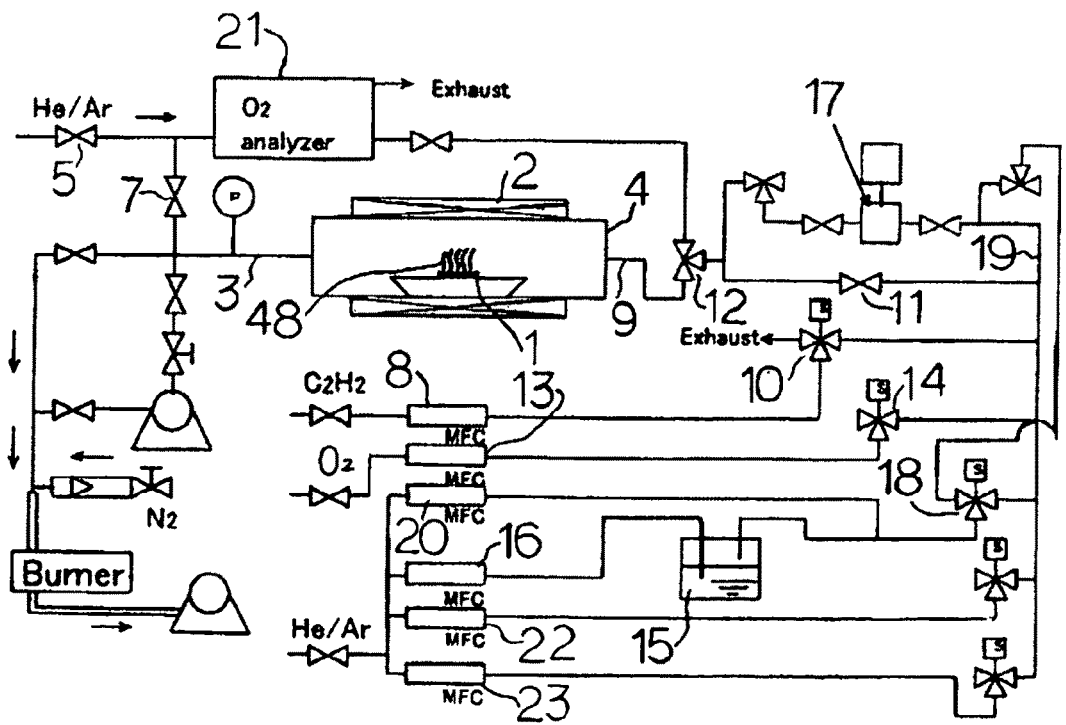
FIG. 6 is a configuration scheme of the brush-like CNT manufacturing apparatus concerning the present invention.

FIG. 6 is a configuration scheme of the brush-like CNT manufacturing apparatus concerning the present invention. This brush-like CNT manufacturing apparatus is a manufacturing apparatus for synthesizing brush-like CNTs 48 by the CVD method. Reaction chamber 4 is heated with reaction heater 2, and said catalyst body 1 is placed in this reaction chamber 4. It is assumed that said catalyst particle layer of this catalyst body 1 is formed by iron system catalyst particles containing the iron element and iron oxides, and in the following, the brush-like CNT manufacturing apparatus is explained in detail. In addition, for the raw material gas, as described above, various kinds of organic gas suitable for generation of CNT, such as hydrocarbon, sulfur-containing organic gas, and phosphorus-containing organic gas, can be chosen, but acetylene gas is cheap and can be obtained easily, and also because it also contains a triple bond, the reactivity with said iron system catalyst particle is high, and therefore it is the preferred raw material gas for growing said brush-like CNTs 48 mature on said iron system catalyst particle.

One end of said reaction chamber 4 is connected to gas exhaust pipeline 3, and to the flow passage that connects to gas exhaust pipeline 3, it is connected to carrier gas container (not shown), through opening and closing valves 5 and 7. For the carrier gas, a mixed gas of helium He and argon Ar is used. For the carrier gas, aside from helium or argon, an inert gas such as neon, $N_2$, $CO_2$, krypton, xenon, or a mixed gas thereof is used. Carrier gas is the gas that transports the raw material gas, and while the raw material gas is consumed by the reaction, the carrier gas is characterized by being inert and therefore non-consumable.

From the raw material gas container (not shown), the raw material gas is supplied to reaction chamber 4 through raw material gas inflow line 9 provided at the other end of reaction chamber 4, and the raw material gas of the raw material gas container is depressurized to the predetermined pressure by the regulator (not shown). The depressurized raw material gas is regulated to the predetermined flow rate by raw material gas flow controller 8 comprising the mass flow controller (MFC). Raw material gas flow controller 8 is installed in the inflow passage communicating with raw material gas inflow line 9, and the raw material gas is supplied through electromagnetic three-way valves 10, 12 and opening and closing valve 11. The carrier gas is supplied by said carrier gas container, through the flow passages of the two systems in which gas flow controller 22, 23 are installed, and the carrier gas is supplied so as to join the raw material gas inflow line 9, as described later.

As for said brush-like CNT manufacturing apparatus, it is a manufacturing apparatus of brush-like CNTs 48, in which said catalyst body 1 is placed in reaction chamber 4, and a carbon nanostructure is grown on catalyst body 1 while the raw material gas is supplied and distributed to reaction chamber 4. Here, an oxidative gas is supplied to reaction chamber 4 along with the carrier gas before the raw material gas is distributed to reaction chamber 4, converting catalyst body 1 to magnetite.

The oxidizing gas includes 0.05 ppm to 3% of water, and 0.01 ppb to 1% of oxygen. From the oxygen cylinder (not shown), filled to the predetermined concentration by gravimetric method, it is regulated to the predetermined flow rate by oxygen flow controller 13 equipped with the mass flow controller (MFC). Oxygen flow controller 13 is installed in the inflow passage communicating with raw material gas inflow line 9, and oxygen is supplied to reaction chamber 4 through electromagnetic three-way valve 14 and opening and closing valve 11. In addition, oxygen analyzer 21 is installed at the introduction path of the carrier gas in front of opening and closing valve 11; to this oxygen analyzer 21, oxygen from the oxygen cylinder is also introduced, and it monitors so that oxygen of a suitable concentration is supplied to reaction chamber 4.

Water addition apparatus 15 comprises a water container equipped with a heater. A carrier gas such as purified He an Ar is introduced into the heated water of water addition apparatus 15 through gas flow controller 16. The mixed gas of water and carrier gas in which water has been added by the flow rate mixing method is supplied to reaction chamber 4 through electromagnetic three-way valve 18 and opening and closing valve 11. The carrier gas joins through gas flow controller 20, and is mixed also at the exit side of water addition apparatus 15. Water analyzer 17 is installed along monitoring bypass line 19 installed on the mixed gas introduction line for the mixed gas of water and the carrier gas, and it is monitored by water analyzer 17 so that water of a suitable concentration is supplied to reaction chamber 4.

Normally, impurities are contained in commercial carrier gases and raw material gases at the production stage. For the carrier gas, as stated previously, an inert gas such as He, neon, argon, $N_2$, $CO_2$, krypton, and xenon may be given as examples, but among them, He and Ar, which are particularly cheap and easily available, can be used. For example, concerning the trace component in the helium gases made by Taiyo Nissan Co., Ltd., oxygen (<1 ppm) and water (<2.6 ppm) are contained in the G2 grade, and oxygen (<0.05 ppm) and water (<0.54 ppm) are contained in the G1 grade. These contained impurities can be used as the oxidizing gas. Furthermore, it is possible to refine for use to a lower concentration level of these contained impurities by means of oxygen scavenger and adsorbent. In addition, in the general (normal) grade, oxygen, water, and others are contained more than in the high purity grades, but it is usable if refined. For the refinement method, several can be given, in which metals such as Pd, Ni, Mn, a Zr system, and a Ti system are usually used as the oxygen scavenger, and synthetic zeolite, alumina, or silica gel is used as the adsorbent.

Next, the gas flow passage switching mechanism is explained. Electromagnetic three-way valve 10 is switched between the blockage state and the supply state through operation of the automatic valve controller (not shown). That is to say, the raw material gas is exhausted to the exhaust side in the blockage state of the raw material gas, the raw material gas is supplied to the injection side in the supply state of the raw material gas, and the raw material gas is mixed with the carrier gas in the merging section leading to opening and closing valve 11. When electromagnetic three-way valve 10 is used, because the raw material gas is already regulated to the predetermined flow rate, an initial fluctuation of the raw material gas does not occur even if it is switched to the injection side. Moreover, because the switching is done by an electromagnetic operation, the switching is done instantly without a pressure force variation, and a slow rise of the raw material gas does not occur, and thereby the raw material gas is supplied at once at the predetermined flow rate. In addition, when the raw material gas is switched from the supply state to the blockage state, the flow rate of the raw material gas can be switched to zero instantly without a pressure force change, through the electromagnetic operation by the automatic valve controller, and there is no slow fall of the raw material gas.

As thus described, when electromagnetic three-way valve 10 is used, the supply to reaction chamber 4 and the blockage of the raw material gas can be done instantly, and moreover, a fluctuation of the flow rate does not occur at all during the switching process. Therefore, the internal gas pressure of reaction chamber 4 becomes constant when the total flow rate is constant. Because the raw material gas is decomposed while this total pressure (gas pressure) is constant, pressure force fluctuation does not occur inside reaction chamber 4, with an effect that the growth of brush-like CNTs 48 is promoted.

The carrier gas and the raw material gas, after they are mixed in said merging section, are supplied as a mixed flow to reaction chamber 4 from the gas supply nozzle (not shown) set up at the tip of raw material gas inflow line 9. Reaction chamber 4 is heated to the temperature range most conductive to the generation of a carbon nanostructure; the raw material gas is thermally decomposed around catalyst body 1, and at the surface of catalyst body 1, brush-like CNTs 48 grow from the decomposition product. In the CVD method, a thermal decomposition method is used to decompose the raw material gas; for example, the laser beam decomposition method, the electron beam decomposition method, the ion beam decomposition method, the plasma decomposition method, or other decomposition methods can be used. Brush-like CNTs 48 are formed on the surface of said catalyst body 1 from the decomposition product of these. The brush-like CNTs are synthesized on the surface of said catalyst body 1 from a portion of the raw material gas, and the unreacted raw material gas which did not contribute to the reaction is purged from gas exhaust pipeline 3 along with the carrier gas.

Example 1

On the catalyst body for production of brush-like CNT of example 1, an oxidized silicon layer is formed by oxidation on the Si (001) surface of a disk-like silicon substrate (a diameter of 6 inches) as said reaction preventive layer, and it constitutes an oxidized silicon ($SiO_2$) substrate. The thickness of said oxidized silicon layer is set to be about 10 nm. On the surface of said $SiO_2$ substrate, a pure iron membrane of 4 nm film thickness is formed as the catalyst metal layer by the electron beam evaporation method, and as preprocessing, a preliminary oxidation treatment before CNT synthesis is done by heating under oxygen atmosphere at 150° C. for 10 minutes. After an aggregation suppressive layer comprising iron oxide has been formed by this oxidation treatment, as the preceding processing before the CVD, it is heated to about 800° C., the reaction temperature of the CNT synthesis, with a rapid temperature increase of 80° C./sec. Then, the catalyst layer formed by said catalyst metal layer and said aggregation suppressive layer is granulated, thus the catalyst particle layer of iron-based catalyst particles is formed, and becomes the catalyst body for production of brush-like CNTs of example 1.

In the following, AFM measurement of the catalyst body surface for production of brush-like CNTs is done, and the AFM images provided from the measurement are shown. The AFM (Atomic Force Microscope) measurement is a method the manufacturing method of comparative example 1. In the following, the effect of forming an oxidized silicon ($SiO_2$) layer as the reaction preventive layer, and the effect of forming an aggregation suppressive layer by preliminary oxidation treatment are explained in detail. In addition, the manufacturing condition of the example and the comparative examples is shown in table 1.

TABLE 1

Catalyst bodies for production of brush-like CNTs

| | <Substrate> | <Reaction Preventive Layer> | <Preliminary Oxidation Treatment> | <Temperature Increase Rate> | <Heating Temperature> |
|---|---|---|---|---|---|
| Example 1 | Si | $SiO_2$ | 150° C. × 10 min | 80° C./sec | 800° C. |
| Example 2 | Si | $SiO_2$ | none | 0.3° C./sec | 700° C. |
| Comparative example 1 | Si | none | none | 80° C./sec | 800° C. |
| Comparative example 2 | Si | $SiO_2$ | none | 80° C./sec | 800° C. |
| Comparative example 3 | Si | none | 150° C. × 10 min | 80° C./sec | 800° C. |
| Comparative example 4 | Si | none | 80° C. × 10 min | 80° C./sec | 800° C. |
| Comparative example 5 | Si | none | 300° C. × 10 min | 80° C./sec | 800° C. | to evaluate the specimen surface configuration, by tracing the specimen surface by means of a sharp-tipped cantilever probe, and measuring the displacement of the cantilever to the top and bottom direction. AFM is usually employed to measure the configuration of fine particles on a substrate. AFM includes several measuring methods, but in this patent technology, the DFM (Dynamic Force Microscope) measurement, which is referred to as the tapping mode, is carried out, in which the surface state is measured with an oscillating probe that moves up and down in a skip-like motion across the specimen surface. As an aside, for the AFM measurement, Model SPI-3800N of Seiko Instruments Co. was employed, and the measurement was carried out using its DFM mode. The scanning frequency was set to 1 Hz, the measurements were done under the ambient atmosphere, and a CNT probe was used as the cantilever probe.

Figure 7:
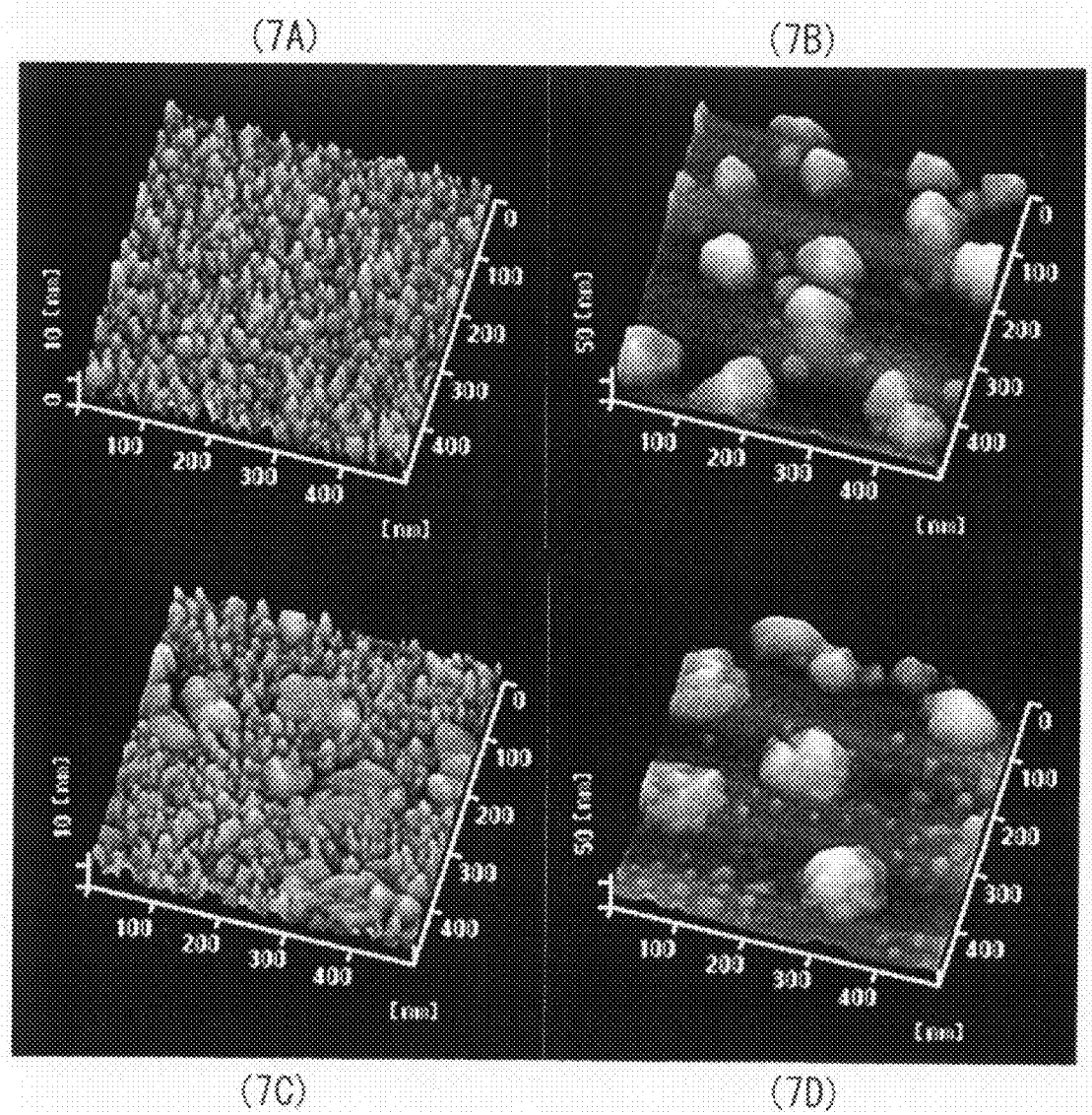
FIG. 7 is AFM images of the surfaces of the catalyst bodies for production of brush-like CNTs of example 1 and of the comparative examples.

FIG. 7 is AFM images of the surfaces of the catalyst bodies for production of brush-like CNTs of example 1 and of the comparative examples. In (7A), the AFM image of example 1 is shown. In (7B), as comparative example 1, AFM image is shown, of the surface of a catalyst body for production of brush-like CNTs surface, in which a catalyst metal layer comprising pure iron membrane of 4 nm film thickness is formed on the Si (001) surface of a silicon substrate, on which a reaction preventive layer is not formed, and a catalyst particle layer was formed by a rapid temperature increase of 80° C./sec without doing a preliminary oxidation. The average particle diameter D in example 1 (7A) is 12 nm, and the range of individual particles is in a range of 0.5-80 nm. Furthermore, in (7C), as comparative example 2, the AFM image of the surface of a catalyst body for production of brush-like CNTs is shown, in which a reaction preventive layer ($SiO_2$ layer: 10 nm) was formed on the Si (001) surface of a silicon substrate, a catalyst metal layer (pure iron membrane: 4 nm) was formed, a rapid temperature increase at 80° C./sec was done without applying a preliminary oxidation treatment, and a catalyst particle layer was thus formed. In (7D), as comparative example 3, the AFM image of the surface of a catalyst body for production of brush-like CNTs is shown, for the case in which the preliminary oxidation treatment was applied by Reaction Preventive Layer: on the Effect of the $SiO_2$ Layer In comparative example 1 of (7B), the density of the iron-based catalyst particles is low, they are enlarged and the particle size exceeds 80 nm, and many enlarged particles that cannot grow CNTs are formed. In comparative example 2 of (7C), because of the formation of the $SiO_2$ layer as the reaction preventive layer, the particle density of the iron-based catalyst particles has increased, and at the same time, the average particle diameter has become small. This difference is due to the formation of iron silicide at the interface with the silicon substrate, and the generation of a large number of enlarged hemispheric silicidated particles whose contact area with the substrate is large. When example 1 shown in (7A) and comparative example 3 shown in (7D) are compared, in (7A) the catalyst particles whose density of the iron-based catalyst particles is high, whose configuration is more uniform, which are closer to a sphere, and which are suitable for the growth of CNTs are formed in a large number, and thus the effect of silicidation suppression by the $SiO_2$ layer is apparent. In particular, as described later, a remarkable difference appears between the brush-like CNTs (cf. (11A) of FIG. 11, (12C) of FIG. 12) for which the catalyst bodies of example 1 and comparative example 3 were used. It may be understood that a catalyst body suitable for production of brush-like CNTs can be obtained by forming a reaction preventive layer comprising $SiO_2$ at the time of the formation of the iron-based catalyst particles.

On the Effect of Preliminary Oxidation Treatment

As described previously, in example 1 in (7A) and comparative example 3 in (7D), after the pure iron membrane had been formed as a catalyst metal layer, the preliminary oxidation treatment was done by heating at 150° C. for 10 minutes. The aggregation suppressive layer comprising iron oxides was formed at the time of the CNT synthesis, before the temperature increasing process in which it was heated to the reaction temperature. When (7A) and (7C) are compared with (7B) and (7D), the enlargement of the iron-based catalyst particles is restrained significantly by the application of the preliminary oxidation. In particular, in comparative example 2 of (7C), just as in example 1, a substrate on which a $SiO_2$ layer has been formed as the aggregation suppressive layer (a $SiO_2$ substrate) is used, but the particle size of the iron-based catalyst particles is around 50-100 nm, many catalyst particles which are not suitable for the growth of CNTs are included, and it is difficult to produce brush-like CNTs of high density. This is thought to be due to the inhibition of fluidity of the iron film and the aggregation of the metal particles, and the restraining of enlargement of the iron-based catalyst particles during the heat-treatment, by means of the aggregation suppressive layer. Furthermore, when (7A) is compared with (7B), it is found that the densification and the uniformization of the catalyst particle layer are realized, and at the same time, the enlargement of the particles is largely restrained, by means of the synergy between the formation of the aggregation suppressive layer by the preliminary oxidation treatment, and said reaction preventive layer.

Example 2

In the catalyst body for production of brush-like CNTs of example 2, just as in example 1, an oxidized silicon layer of 10 nm thickness is formed as said reaction preventive layer on the Si (001) surface of a disk-like silicon substrate (diameter 6 inches), and a pure iron membrane of 4 nm film thickness is formed as the catalyst metal layer by the electron beam evaporation method. In example 2, a preliminary oxidation is not done, and the formation of the aggregation suppressive layer and the granulation are done approximately at the same time during the temperature increasing process. Here, the temperature increase rate prior to CVD is 0.3° C./sec, and example 2 is a catalyst body for production of brush-like CNTs, whose purpose is to grow brush-like CNTs at 700° C.

Figure 8:
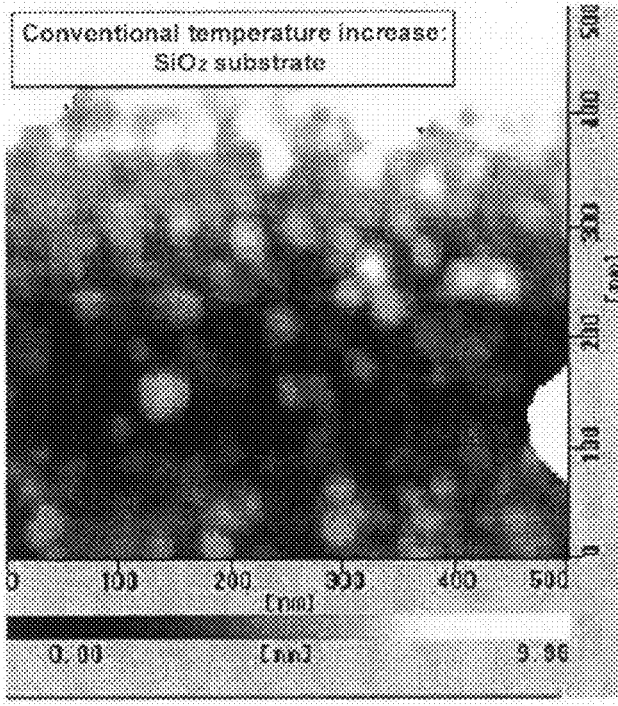
FIG. 8 is AFM images of the surface of the catalyst bodies for production of brush-like CNTs of example 2 and a comparative example.
Figure 8:
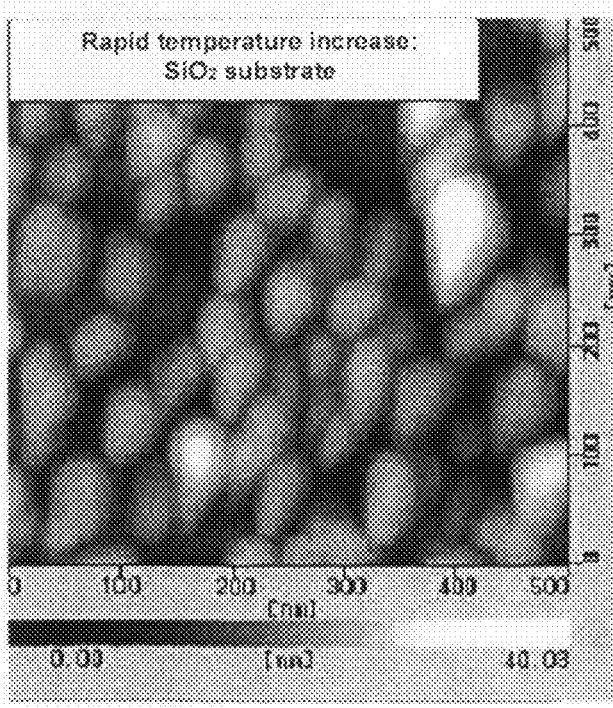

FIG. 8 is AFM images of the surface of the catalyst bodies for production of brush-like CNTs of example 2 and comparative example 2. The temperature increase rate and the heating temperature are varied upon the formation of the aggregation suppressive layer during the temperature increasing process prior to CVD. (8A) is an AMF image of example 2 which was heated to 700° C., with the temperature increase rate prior to CVD being 0.3° C./sec. Comparative example 2 shown in (8B) is a catalyst body for production of brush-like CNTs which was heated to 800° C. prior to CVD, the temperature increase rate being set to 80° C./sec. In example 2 and comparative example 2, because the reaction preventive layer comprising $SiO_2$ is formed with a thickness of 10 nm, the catalyst particle diameter is uniform in both. In example 2 of (8A), the particle size of the iron-based catalyst particles is 20-30 nm, and they are granulated uniformly. On the other hand, in comparative example 2 of (8B), the particle size of the iron-based catalyst particles is around 50-100 nm, many catalyst particles which are not suitable for the growth of CNT are included, and producing brush-like CNTs of high density is difficult. Therefore, just as in example 2, when said aggregation suppressive layer is formed during the temperature increasing process prior to CVD, it is preferable that the temperature increase rate is less than 0.3° C./sec. In other words, when the temperature increase rate is set larger than 80° C./sec, just as in example 1 shown in (7A) of FIG. 7, a catalyst body for production of brush-like CNTs can be produced at a higher temperature increase rate by doing a preliminary oxidation, so that the production efficiency can be improved markedly.

Figure 9:
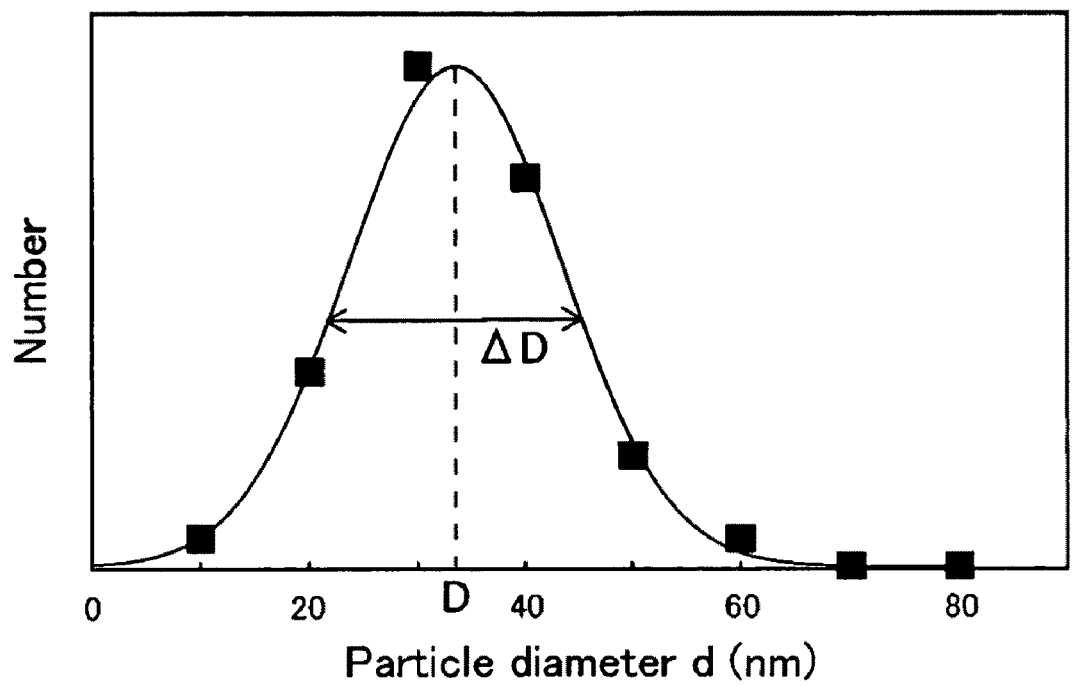
FIG. 9 is a particle size distribution graph of iron-based catalyst particles that were produced by the same method as example 2.

FIG. 9 is a particle size distribution graph of iron-based catalyst particles that were produced by the same method as example 2. The plots (square marks: ■) indicate the number (Number) corresponding with particle size d (Particle diameter) that was estimated from the AFM image, and the particle size distribution shown by the solid line indicates the fit with a distribution function. Average particle diameter D is about 34 nm, and half band width ΔD of the distribution function is 23 nm. That is to say, ratio ΔD/D corresponding to average particle diameter D of half band width ΔD is 0.68. It has been confirmed that rope-like CNTs can be made from brush-like CNTs produced by using a catalyst body for production of brush-like CNTs with the particle size distribution in the figure. As an aside, as described previously, it has been confirmed that the uniformization is improved by forming an aggregation suppressive layer by a preliminary oxidation, and it is possible to make the ratio ΔD/D smaller. The more the uniformization of said catalyst particle layer is improved, the more uniform brush-like CNTs can be produced.

Figure 10:
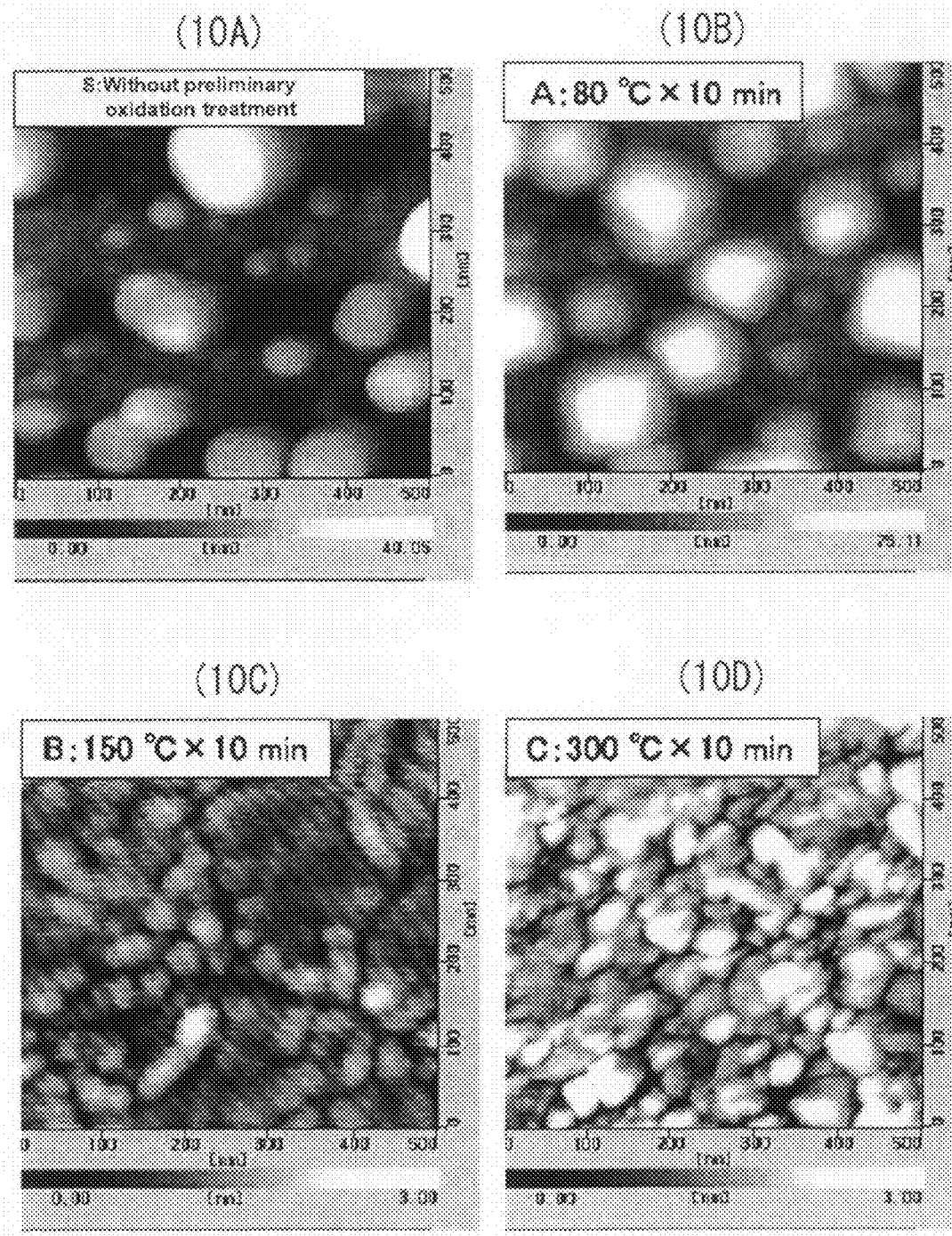
FIG. 10 is AFM images of comparative example 1 and comparative examples 3-5, which are shown for a comparison between the effect of the preliminary oxidation treatment and the processing temperature.

FIG. 10 is AFM images of comparative example 1 and comparative examples 3-5, which are shown for a comparison between the effect of the preliminary oxidation treatment and the processing temperature. In each of comparative example 1 of (10A), comparative example 4 of (10B), comparative example 3 of (10C), and comparative example 5 of (10D), a catalyst metal layer comprising a pure iron membrane is formed on a silicon substrate, and the effect of preliminary oxidation treatment is clarified even more. In addition, the temperature increase rate of the temperature increasing process, in which said catalyst metal layer is granulated, is 80° C./sec for all, and they are heated to 800° C. In comparative example 1 of (10A), as described previously, a preliminary oxidation is not done, and the enlargement and the deviation from uniformity of the iron-based catalyst particles are remarkable. In comparative example 4 in (10B), after having formed an aggregation suppressive layer through applying an oxidation treatment for 10 minutes at 80° C. under an oxidizing gas atmosphere, the temperature is raised to 800° C., which is equivalent to the reaction temperature of CNTs, and thus the catalyst layer is granulated. In comparative example 3 in (10C), the preliminary oxidation treatment is done at 150° C. for 10 minutes, and in comparative example 5 in (10D), the preliminary oxidation treatment is done at 300° C. for 10 minutes.

In comparative example 4 in (10B), the effect of the preliminary oxidation treatment is not sufficient, and the catalyst particles are enlarged. It is preferable that the heating temperature in an oxidation treatment be set higher than 80° C., at the minimum. In comparative example 3 in (10C), the iron-based catalyst particles are deformed in several places by the preliminary oxidation treatment of 150° C. for 10 minutes, but their particle size is smaller in comparison with (10B), and the particle size of 30-50 nm is observed. In comparative example 5 in (10D), the configuration varies in the iron-based catalyst particles, and angular lumps are observed. Here, it is thought that the formation of a catalyst particle does not happen adequately when the ratio of the oxidized aggregation suppressive layer becomes too large in comparison with the catalyst metal layer. Brush-like CNTs could not be synthesized by means of the catalyst body in (10D). As described before, these conditions are all ones in which the effect of preliminary oxidation treatment on Si substrates was examined, and a condition is observed in which iron silicide is formed by a rapid temperature increase, and the configuration of the catalyst particles deviate partially from uniformity.

Example 3

Figure 11:
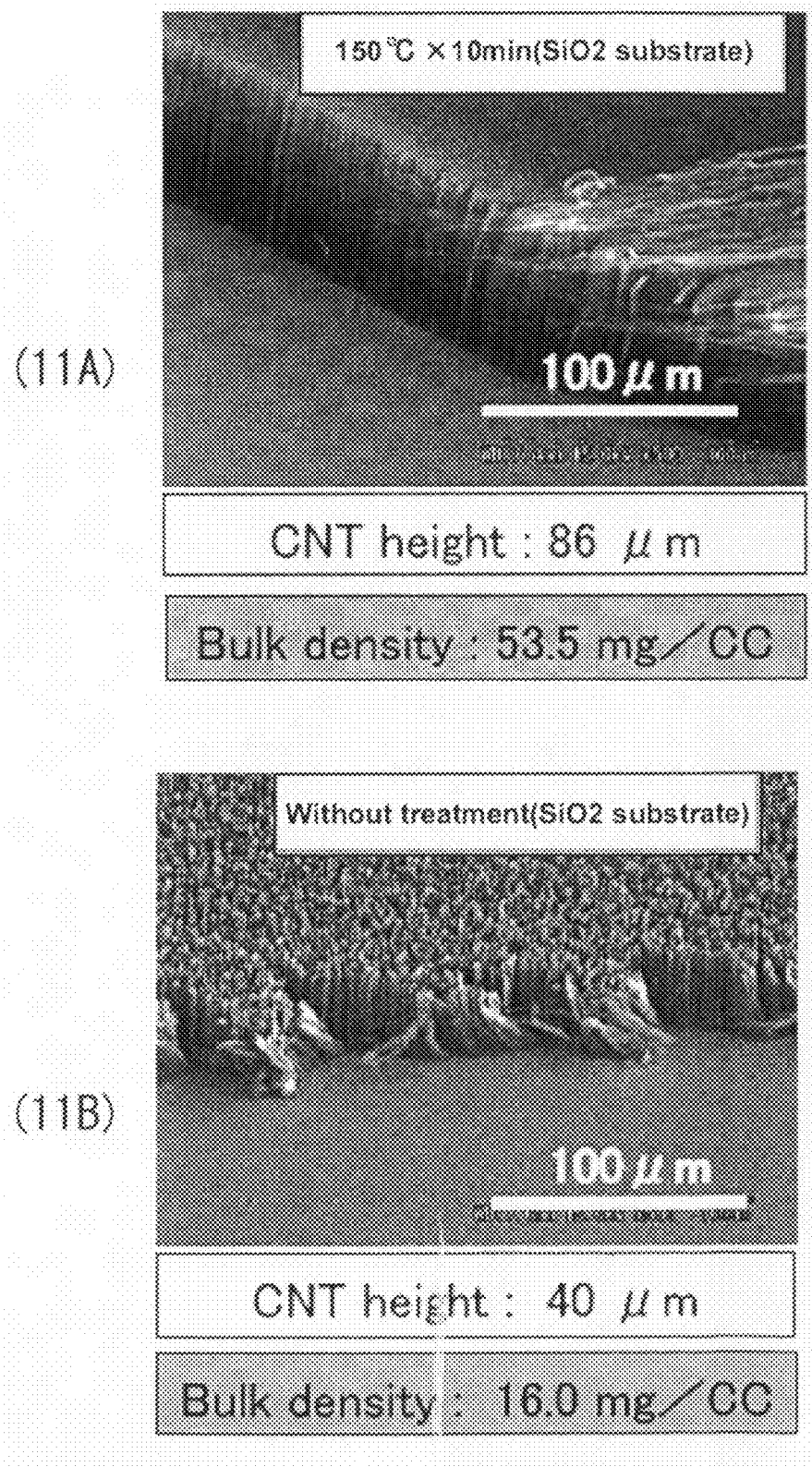
FIG. 11 is scanning electron microscope (SEM) images in which the brush-like CNTs of example 3 and comparative example 6 are observed.

Example 3 is brush-like CNTs produced by means of the catalyst body for production of brush-like CNTs of example 1, in which the brush-like CNTs are produced by using acetylene as the raw material gas, and by setting the reaction temperature to 800° C. by the CVD method. In addition, He gas is used as the carrier gas. FIG. 11 is scanning electron microscope (SEM) images in which the brush-like CNTs of example 3 and comparative example 6 are observed. The brush-like CNTs of comparative example 6 are brush-like CNTs that were produced by using the catalyst body of comparative example 2 (cf. (8B) of FIG. 8) under the same condition. As shown in (11A), from the catalyst body for production of brush-like CNTs of example 1, it is observed that uniform brush-like CNTs are grown in high density. The average height of the brush-like CNTs is 86 μm, and their bulk density is 53.5 mg/CC (mg/cm³). As shown in (11B), the brush-like CNTs of comparative example 6 have low CNT density, the average height of the brush-like CNTs is 40 μm, and their bulk density is 16.0 mg/CC. That is to say, the result is obtained in which the bulk density of the CNTs increases conspicuously when the preliminary oxidation treatment is done at 150° C. for 10 minutes. It is confirmed that rope-like CNTs are produced from the brush-like CNTs of example 3.

Figure 12:
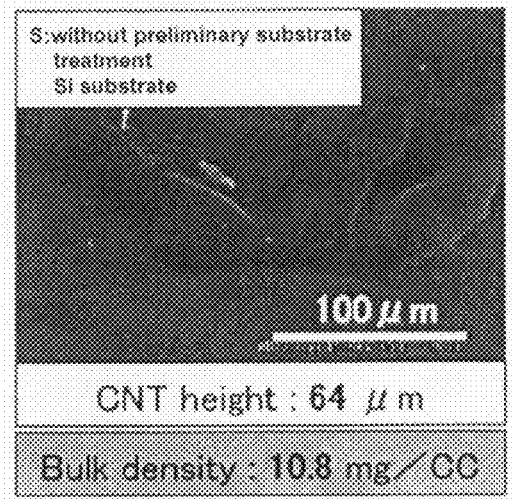
FIG. 12 is SEM images in which the brush-like CNTs of comparative example 7-9 are observed.
Figure 12:
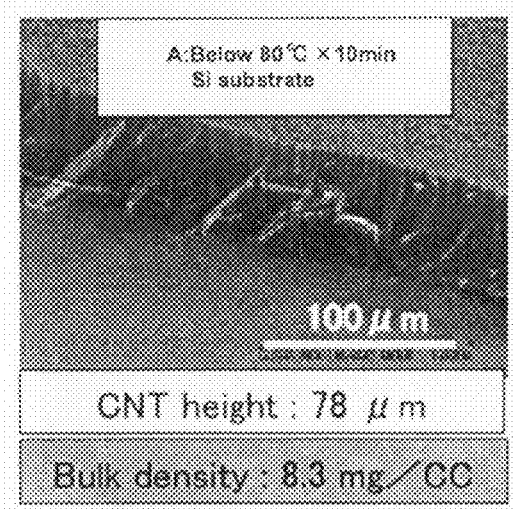
Figure 12:
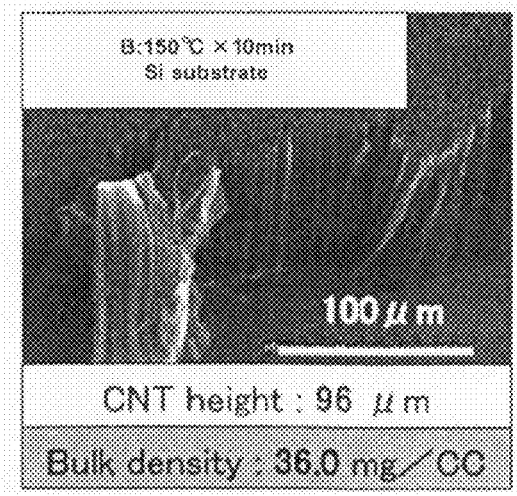

FIG. 12 is SEM images in which the brush-like CNTs of comparative example 7-9 are observed. As an aside, also in comparative example 7-9, acetylene is used as the raw material gas, and the reaction temperature is set to 800° C. The brush-like CNTs of comparative example 7 shown in (12A) are brush-like CNTs produced by using the catalyst body for production of brush-like CNTs of comparative example 1 (cf. (7B) of FIG. 7) (no preliminary oxidation treatment, no reaction preventive layer). The average height of the brush-like CNTs is 64 μm, but because they have low density, the bulk density of the CNTs is 10.8 mg/CC. The brush-like CNTs of comparative example 8 shown in (12B) are brush-like CNTs produced by using the catalyst body for production of brush-like CNTs of comparative example 4 (cf. (9B) of FIG. 10). The height of the CNTs extends to 78 μm, but the bulk density is 8.3 mg/CC, a low value. This, as previously described, is caused by a reaction preventive layer not having been formed, and furthermore, the heating temperature in the preliminary oxidation treatment being a low temperature of 80° C., the formation of the aggregation suppressive layer being insufficient, and thus the density of the catalyst particle layer being low. The brush-like CNTs of comparative example 9 shown in (12C) are brush-like CNTs produced by using the catalyst body for production of brush-like CNTs of comparative example 3 (cf. (10B) of FIG. 10). The height of the CNTs is 96 μm, but their bulk density is 36.0 mg/CC, a considerably low value in comparison with example 3 of FIG. 11 (11A), and it is caused by the reduction of the density of the catalyst particle layer, which in turn is caused by the lack of formation of the reaction preventive layer. But in (12C), the bulk density has increased in comparison with (12A) and (12B) by doing the processing for 10 minutes at 150° C., and it is found that the condition of the preliminary oxidation treatment is more favorable. As an aside, rope-like CNTs could not be produced from the brush-like CNTs of comparative example 7-9 shown in (12A)-(12C). In addition, the example and the comparative examples concerning brush-like CNTs are shown for table 2.

TABLE 2

| | | Brush-like CNTs | | | |
|---|---|---|---|---|---|
| | <Catalyst Body> | <Bulk Density: mg/cm³> | <Average Height of CNTs: μm> | <Temperature Increase Rate: ° C./sec> | <Reaction Temperature> |
| Example 3 | Example 1 | 53.5 | 86 | 80 | 800° C. |
| Comparative example 6 | Comparative example 2 | 16.0 | 40 | 80 | 800° C. |
| Comparative example 7 | Comparative example 1 | 10.8 | 64 | 80 | 800° C. |
| Comparative example 8 | Comparative example 4 | 8.3 | 78 | 80 | 800° C. |
| Comparative example 9 | Comparative example 3 | 36.0 | 96 | 80 | 800° C. |

Figure 13:
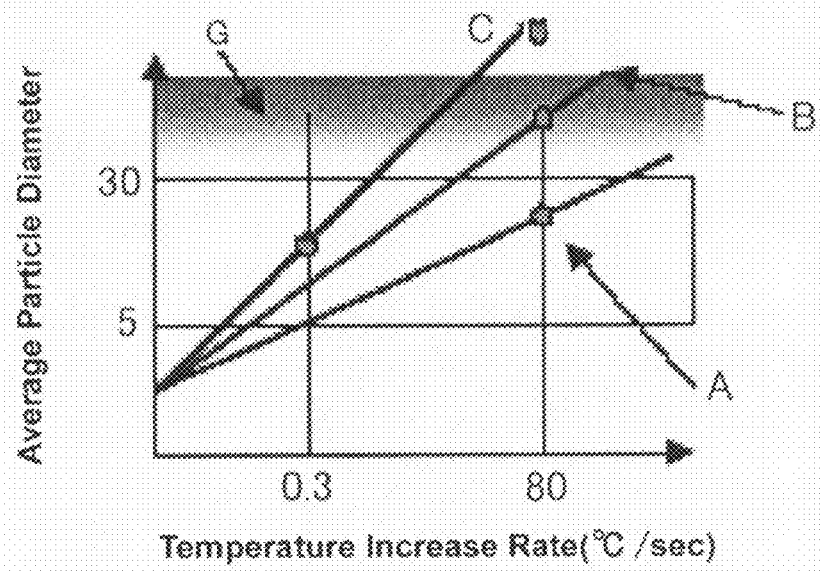
FIG. 13 is a graph that shows the relation between the temperature increase rate and the average particle diameter.

In FIG. 13, the relation is shown between the temperature increase rate during the temperature increasing process in which the catalyst layer concerning the present invention is granulated, and average particle diameter D of the formed metallic catalyst particles. Here, the metallic catalyst particles are iron-based catalyst particles. Line A shows the relation between said temperature increase rate and said average particle diameter D, for the situation in which said catalyst metal layer is heated to 150° C. under an oxidizing gas atmosphere as the preliminary oxidation treatment, in which the oxidation treatment is applied for 10 minutes (preliminary oxidation treatment: 150° C.×0 min), and the catalyst particle layer is formed during said temperature increasing process after the formation of the aggregation suppressive layer. Line B indicates the relation of said temperature increase rate and said average particle diameter C in the case where the preliminary oxidation treatment has been applied to said catalyst metal layer at 80° C. for 10 minutes, and line C indicates the relation of said temperature increase rate and said average particle diameter C in the case where the metallic catalyst particle was formed in the temperature increasing process without application of a preliminary oxidation treatment. Lines A-C are estimated by the observed value plotted in the graph. In addition, the gradated area G indicates where it gradually becomes more difficult to produce CNTs.

As shown in the figure, for the case of the preliminary oxidation treatment at 150° C.×10 min in line A, the slope is comparatively small, and even when the temperature increase rate is increased so that 80° C./sec is reached, metallic catalyst particles with the average particle diameter D of less than 30 nm are formed, and become a component of the catalyst metal layer. In addition, for the case of the preliminary oxidation treatment of line B at 80° C.×10 min, the slope becomes large in comparison with line A, and when the temperature increase rate exceeds 80° C./sec, average particle diameter D falls on area G where it becomes difficult to produce CNTs. For the case indicated in line C, where a preliminary oxidation treatment is not applied, at least up to the temperature increase rate of 10° C./sec, the metallic catalyst particles have average particle diameter D that is suitable for the growth of CNTs.

However, when the temperature increase rate is greater than 10° C./sec, it is preferable to apply a preliminary oxidation treatment.

In addition, when said substrate is Si, $SiO_2$ whose affinity has been decreased by the oxidation of the Si substrate surface is formed as the reaction preventive layer, for preventing a reaction with the Si substrate of the metallic catalyst particle layer. Furthermore, in the case where the metallic catalyst particle layer consists of iron and iron oxides, it is formed by $Fe_2O_3$ composite particles that contain at least $Fe_2O_3$. For example, said $Fe_2O_3$ composite particle contains $Fe_2O_3$ along with $Fe_2O_3$. Its structure is that of the catalyst body described in FIG. 2.

Shown in table 3, as examples 6-8, are the evaluations of the brush-like CNTs produced by the catalyst bodies concerning the present invention, which were obtained by the use of a catalyst metal salt solution, in which iron nitrate or iron nitrate nonahydrate has been dissolved in a solvent. That is to say, in table 3, it is evaluated whether or not brush-like CNTs can be produced by the catalyst body for production of brush-like CNTs which was obtained by the use of the solution in which a catalyst metal salt has been dissolved (solution concentration 0.6 wt %) in a mixture liquid of ethanol and α-terpineol or a solvent comprising ethanol. In the table, the cases in which brush-like CNTs grew are marked with a circle. Whenever homogeneous and highly dense brush-like CNTs are obtained, rope-like CNTs can be made easily. It is preferable that the solvent have a strong wettability of the reaction preventive layer, and the particle size of the catalyst particles can be made small by forming a thinner catalyst metal layer. Furthermore, for the metal salt, various types of iron complex can be used. For example, an acetylacetonatoiron complex, a DMF (dimethylformamide) iron complex, a halogenoiron complex, or a cyanoiron complex can be used.

TABLE 3

Evaluation of the catalyst metal salt solutions and brush-like CNTs

| <Examples> | <Solvent> | <Metal Salt> | <Brush-like CNTs> |
|---|---|---|---|
| 6 | Mixture of ethanol and α-terpineol | Iron nitrate | ○ |
| 7 | Ethanol | Iron nitrate | ○ |
| 8 | Ethanol | Iron sulfate nonahydrate | ○ |

Figure 14:
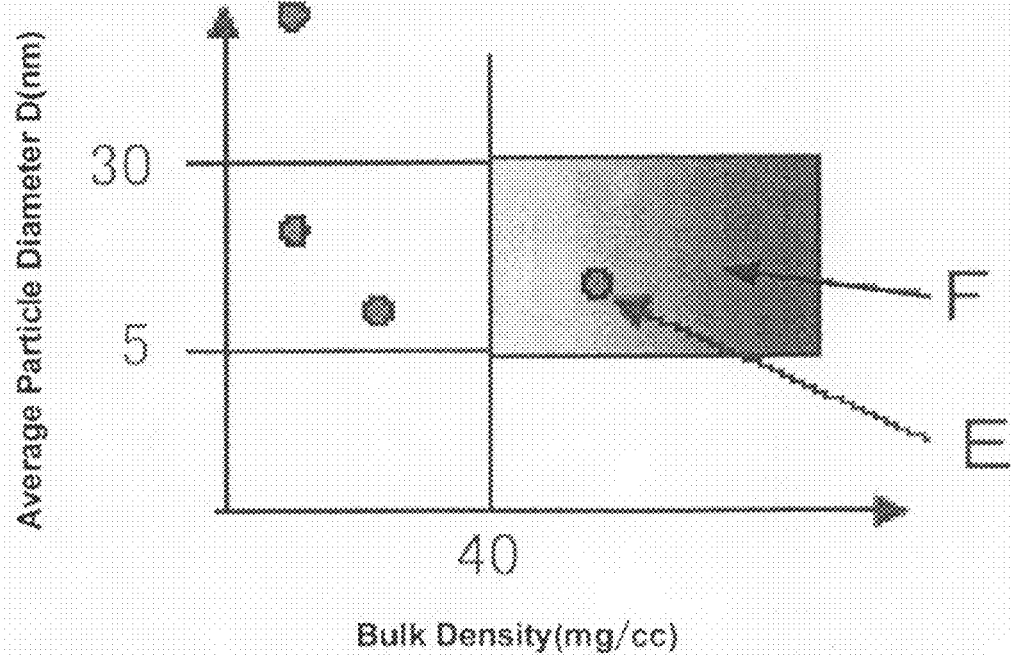
FIG. 14 is a graph that shows the condition for oriented CNTs from which rope-like CNTs can be produced, from the relation between the CNT bulk density and the catalyst particle diameter.
Figure 15:
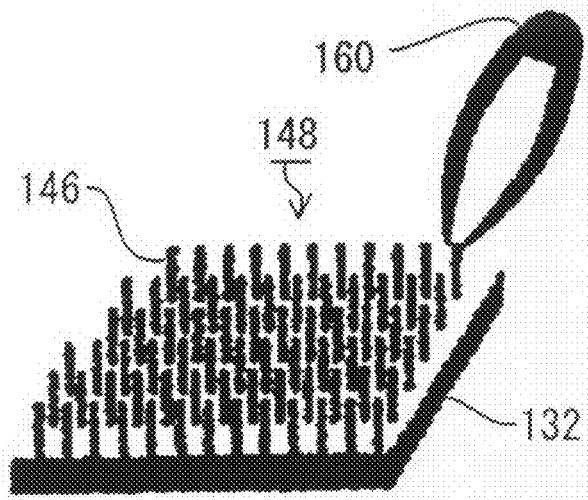
FIG. 15 is a schematic figure in which the production method of the conventional rope-like CNTs is explained.
Figure 15:
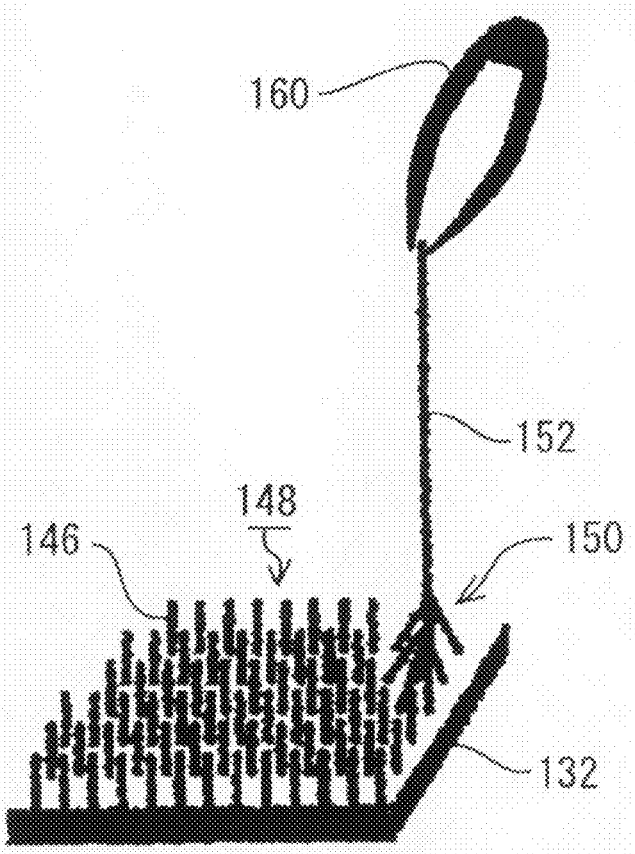
Figure 16:
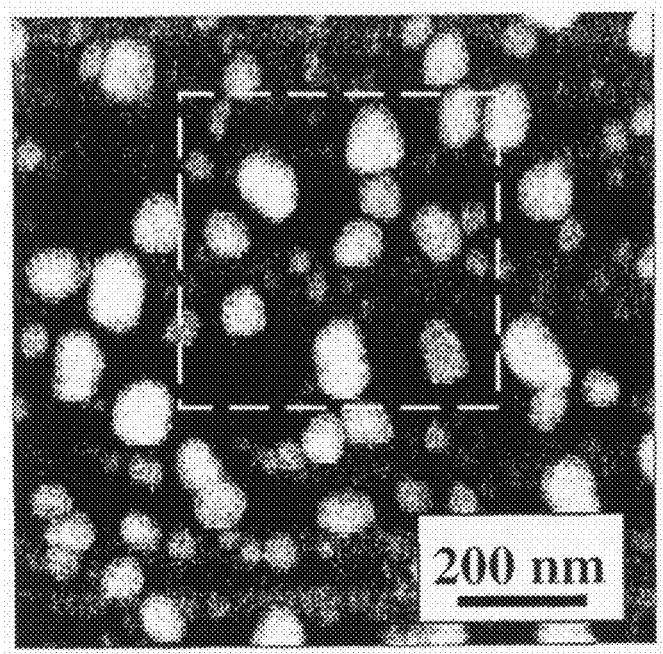
FIG. 16 is an atomic force microscope (AFM) image of the iron catalyst particles formed on the conventional silicon substrate surface.
Figure 16:
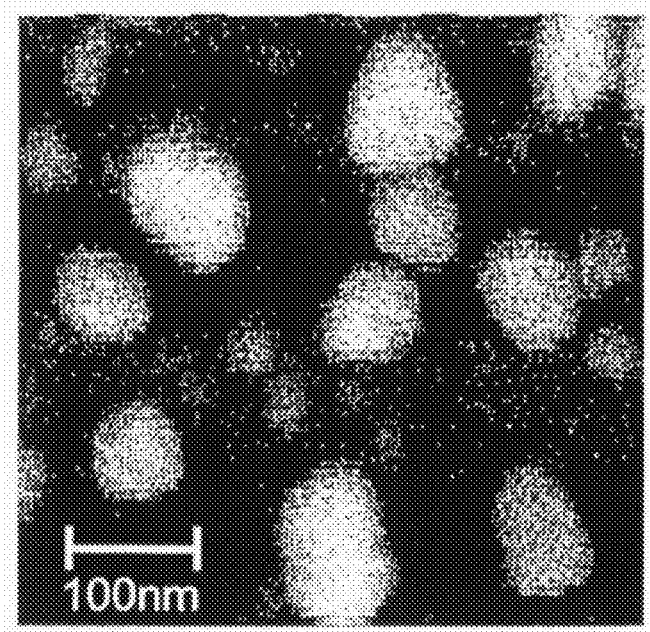
Figure 17:
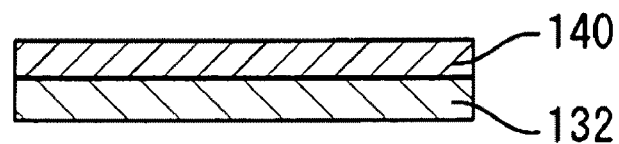
FIG. 17 is a schematic illustration that shows the configuration of the conventional catalyst body and brush-like CNTs, and their production method.
Figure 17:
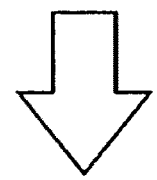
Figure 17:
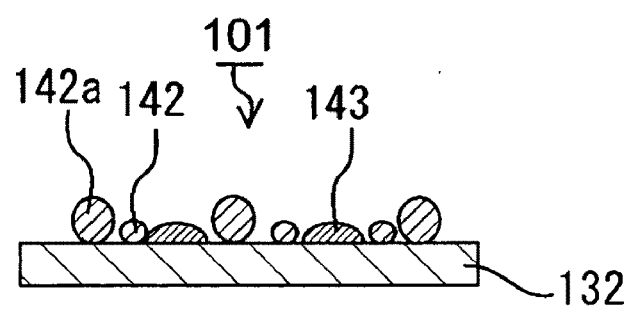
Figure 17:
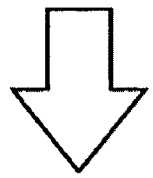
Figure 17:
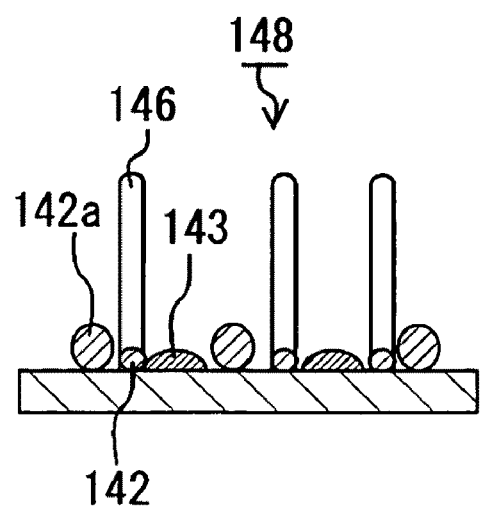

FIG. 14 shows the condition for oriented CNTs from which rope-like CNTs can be produced, from the relation between the CNT bulk density and the catalyst particle diameter. Plot E indicates the catalyst body for production of brush-like CNTs of example 1, and area F indicates the optimum range in which rope-like CNTs can be produced. As an aside, the more the bulk density increases, the more easily rope-like CNTs can be made. As for the condition where rope-like CNTs may be produced, the necessary CNT bulk density is 20 $mg/cm^3$, preferably equal to or more than about 40 $mg/cm^3$, and at the same time, it is desirable that the average particle diameter D of the metallic catalyst particle be within a range of about 20-30 nm.

The present invention is not limited to the above-described embodiments, and it goes without saying that various modifications, design alterations and the like that may be made within limits that involve no departure from the technical concept of the present invention are included in the technical scope of the invention.

INDUSTRIAL APPLICABILITY

According to the catalyst body for production of brush-shaped carbon nanostructure concerning the present invention, it can produce CNTs with high efficiency, and at the same time, it can produce highly dense, homogeneous brush-like CNTs with long length of the CNTs and other types of the brush-like carbon nanostructures, which are indispensable to the production of so-called rope-like CNTs which is an aggregate of CNTs. That is to say, highly oriented CNTs with high density and long length can be produced. The rope-like CNTs which are produced by means of the brush-like CNT concerning the present invention are ultra light weight, high strength fibers, and they can be used as electric wires made from carbon, or various types of carbon materials.

The invention claimed is:
1. A process for producing catalyst body for production of brush-shaped carbon nanostructure, comprising the steps of
    forming a reaction preventive layer consisting of oxides on the surface of a substrate by heating-treating said substrate,
    forming a catalyst metal layer on the surface of said reaction preventive layer,
    forming an aggregation suppressive layer consisting of metal oxide on the surface of said catalyst metal layer by heat-treating in a temperature range of 80-800° C.,
    granulating uniformly a catalyst layer consisting of said catalyst metal layer and said aggregation suppressive layer by heating at a temperature increase rate equal to or of more than 10° C./sec; and
    forming a catalyst particle layer consisting of metallic catalyst particles whose main constituent is a catalyst metal on the surface of said reaction preventive layer.

* * * * *